US007941851B2

(12) United States Patent
Shahar et al.

(10) Patent No.: US 7,941,851 B2
(45) Date of Patent: May 10, 2011

(54) ARCHITECTURE FOR IDENTIFYING ELECTRONIC THREAT PATTERNS

(75) Inventors: Yuval Shahar, Omer (IL); Assaf Shabtai, Carme Yosef (IL); Gil Tahan, Omer (IL); Yuval Elovici, Moshav Arugot (IL)

(73) Assignee: Deutsche Telekom AG, Bonn (DE)

( * ) Notice: Subject to any disclaimer, the term of this patent is extended or adjusted under 35 U.S.C. 154(b) by 1065 days.

(21) Appl. No.: 11/657,247

(22) Filed: Jan. 24, 2007

(65) Prior Publication Data

US 2007/0192859 A1        Aug. 16, 2007

(30) Foreign Application Priority Data

Jan. 31, 2006   (IL) ......................................... 173472

(51) Int. Cl.
*G06F 11/00* (2006.01)
(52) U.S. Cl. ................ 726/22; 726/23; 726/24; 726/25; 713/188
(58) Field of Classification Search .............. 726/22–25; 713/188
See application file for complete search history.

(56) References Cited

U.S. PATENT DOCUMENTS

| | | | |
|---|---|---|---|
| 7,010,696 B1 * | 3/2006 | Cambridge et al. .......... | 713/188 |
| 2003/0131256 A1 * | 7/2003 | Ackroyd ....................... | 713/201 |
| 2004/0128267 A1 | 7/2004 | Berger et al. | |
| 2007/0152854 A1 * | 7/2007 | Copley ............................ | 341/51 |

OTHER PUBLICATIONS

Shahar, Y. et al: "Model-based visualization of temporal abstractions"; May 16-17, 1998; pp. 11-20; XP002437464.
Abdullah, K. et al: "IDS Rainstorm: Visualizing IDS alarms"; IEEE workshop Oct. 26, 2005; XP 010852592.
D. Boaz, and Y. Shahar "A distributed temporal-abstraction mediation architecture for medical databases", Artificial Intelligence in Medicine, 2005. 34 (1), 3-24.
Y. Shahar, "A Framework for knowledge-based temporal abstraction", Artificial intelligence, 1997. 90(1-2): p. 79-133.
Y. Shahar et al., "KNAVE II: A distributed architecture for interactive visualization and . . . data", Intelligent Data Analysis in Medicine and Pharmacology. 2003, Cyprus.
D. Klimov and Y. Shahar "A Framework for Intelligent Visualization of Multiple Time-Oriented Medical Records", AMIA. 2005.
A. Spokoiny et al., "Momentum—An active time-oriented database for intelligent abstraction . . . data", Medical Informatics (MEDINFO). 2004. San Francisco, CA.

\* cited by examiner

*Primary Examiner* — Thanhnga B Truong
*Assistant Examiner* — Angela Holmes
(74) *Attorney, Agent, or Firm* — Roach Brown McCarthy & Gruber, P.C.; Kevin D. McCarthy

(57) ABSTRACT

The invention is a comprehensive conceptual and computational architecture that enables monitoring accumulated time-oriented data using knowledge related to the operation of elements of a computer network and deriving temporal abstractions from the accumulated data and the knowledge in order to identify electronic threat patterns and create alerts. The architecture of the invention supports two main modes of operation:
  a. an automated, continuous mode for monitoring, recognition and detection of known eThreats; and
  b. an interactive, human-operated intelligent tool for dynamic exploration of the contents of a security storage service to identify new temporal patterns that characterize such threats, and to add them to the monitoring database.

The architecture of the invention can analyze data collected from various sources, such as end-user devices, network element, network links etc., to identify potentially infected devices, files, sub-streams or network segments.

7 Claims, 19 Drawing Sheets

Fig. 12C

ARCHITECTURE FOR IDENTIFYING ELECTRONIC THREAT PATTERNS

FIELD OF THE INVENTION

The invention is concerned with the field of computer security. Specifically the invention relates to an architecture that enables monitoring accumulated time-oriented data using knowledge related to the operation of elements of a computer network and to derive temporal abstractions from the accumulated data and the knowledge in order to identify electronic threat patterns and create alerts.

BACKGROUND OF THE INVENTION

The increasing dependence of companies and government agencies on their computer networks highlights the importance of protecting these systems from attacks. A single malware (malicious software) in a computer which is a part of a computer network can result in the loss or unauthorized utilization or modification of large amounts of data and cause users to question the reliability of all of the information on the network.

A typical problem for a network administrator is observing the network being congested by a new Internet virus or worm spreading itself from thousands of client machines. It is often impossible to remotely remove a worm or to get in touch with an inexperienced user to give virus removal instructions. The obvious choice would be to start a virus scanner on a dedicated machine and analyze all traffic from/to clients. This would involve huge CPU resources in case of high network load and thus it is not practical and also will require knowing the attacking worm signature, which usually takes a lot of time to produce, during which time the worm continues to propagate.

In addition to the worm-related attacks which propagate automatically, other types of malicious codes are propagated manually and in many cases the malicious code is actually an unobtrusive information-gathering probe. Client-side vulnerabilities target the computer systems of individual user computers rather than servers of an organization. The perpetrators exploiting client-side vulnerabilities target applications such as: Web browsers, email clients, P2P networks, Instant Messaging clients, and media players. They are often, but not always, the result of logic errors or flaws in access-control systems, and are often easily exploitable, particularly in browsers. Active exploitation of browser vulnerabilities has shown that client-side vulnerabilities are very attractive to attackers. This is because it is much easier to exploit a single vulnerable workstation through universally-exploitable client-side vulnerability than to penetrate a target organization from outside the perimeter defenses. Compounding this risk is the fact that the users on client systems may not be as security conscious as security administrators, whose primary role is to secure networks and servers. Examples of different categories of electronic threats (eThreats) are:

Trojans are increasingly being installed via malicious Web sites. They exploit browser vulnerabilities that allow malicious code authors to download and execute the Trojans with little or no conscious user interaction. Trojans appear to serve some useful purpose, which encourages users to download and run them, but actually carry a destructive function. They may masquerade as legitimate applications available for download from various sources or be sent to an unsuspecting user as an email attachment. If Trojans are executed on a computer they can be extremely destructive, with payloads ranging from unauthorized export of confidential data to surreptitious reformatting of hard drives.

Adware packages perform numerous operations including displaying pop-up ads, dialing to high-cost numbers through the system's modem if one is present, modifying browser settings such as the default home page and monitoring the user's surfing activity to display targeted advertisements. Their effects range from mere user annoyance to privacy violations to monetary loss.

Spyware is often installed surreptitiously on a user's computer when the user downloads free software from the Internet. It may be downloaded in conjunction with legitimate applications or through illegitimate means, such as exploitation of client-side vulnerabilities in Web browsers. In addition to privacy and confidentiality issues, this software often will redirect users to adult Web sites, provide unwanted pop-up ads, and even update itself dynamically.

Spam messages are annoying on individual computers. However, high volumes of spam can create Denial of Service (DoS) conditions wherein email systems are so overloaded that legitimate email and network traffic are unable to get through. The volume of email generated by Spammers forces administrators and users to expend already overextended resources filtering suspect messages and scanning for malicious code. As such, the costs associated with preventive and mitigating strategies are increasing.

Phishing (password hijacking) is an attempt by a third party to solicit confidential information from an individual, group, or organization, often for financial gain. Perpetrators attempt to trick users into disclosing credit card numbers, passwords, online banking information, or other sensitive information that is then used to commit fraudulent acts. Phishing may be conducted through email, spam, spyware, and blended threats. Perpetrators have used email to trick users into entering confidential information into fraudulent Web sites or forms.

The threatening situation described above has been amplified in part by increased global terrorism and criminal activities on the Web in recent years. Today the Web is used as an enabling platform for a plethora of illegal activities ranging from credit card fraud, through identity phishing, to transferring money and orders. Web application attacks are expected to increase in the near future; targeted attacks on firewalls, routers, and other security devices protecting users' systems will be a growing security concern; sophisticated methods of control and attack synchronization that are difficult to detect and locate will be used, and finally, more attempts to exploit mobile end-user devices will be documented.

Needless to say, enormous efforts are being made to provide defenses against all of these types of known threats as well as presently unknown threats which will no doubt appear in the future. All large and medium organizations, and even small ones in critical fields of endeavor, employ computer security experts to protect their networks from electronic threats (eThreats).

If the security expert must depend only upon receiving feedback from the individual users who report what appears to them to be abnormal operation of their computers, then in most cases the damage to the organization's network will be extensive before any protective or corrective action can be taken. It is therefore of critical importance that tools are provided that assist the security expert to monitor the network and alert him of the presence of eThreats at a very early stage.

It is a purpose of this invention to provide comprehensive architecture designed to enable early detection of electronic threat by manual inspection and automatic monitoring of continuously accumulated time-oriented raw security data and temporal abstractions of it; thereby identifying eThreat patterns and creating alerts.

It is another purpose of this invention to provide the architecture with elements that allow data collected from various sources, such as end-user devices, network element, network links etc., to be analyzed in order to identify potentially infected devices, files, sub-streams or network segments.

It is another purpose of this invention to provide as part of the architecture a visualization interface for exploration of multiple security-oriented records and their correlations over time, thus supporting also an interactive mode that enables identifying new eThreats.

It is another purpose of this invention to provide as part of the architecture a graphical knowledge-acquisition and maintenance tool that enables the security expert to easily add new patterns to the knowledge base, or modify existing ones.

Further purposes and advantages of this invention will appear as the description proceeds.

SUMMARY OF THE INVENTION

The invention is a comprehensive conceptual and computational architecture that enables monitoring accumulated time-oriented data using knowledge related to the operation of elements of a computer network. The architecture of the invention is able to derive temporal abstractions from the accumulated data and the knowledge in order to identify electronic threat patterns and create alerts. The architecture supports two main modes of operation:
  a. an automated, continuous mode for monitoring, recognition and detection of known eThreats; and
  b. an interactive, human-operated intelligent tool for dynamic exploration of the contents of a security storage service.

The architecture of the invention is able to support the two main modes of operation by integrating:
  a. a set of time-oriented security data sources;
  b. a set of one or more knowledge bases specific to the process of detecting meaningful temporal patterns of not only raw data but also higher-level, abstracted concepts;
  c. a temporal abstraction computational process that creates abstract patterns such as eThreats from the integration of the data and knowledge;
  d. a monitoring service that continuously applies the relevant security knowledge to the accumulating data;
  e. an effective visualization interface for exploration of multiple security-oriented records and their correlations over time, thus supporting also an interactive mode that enable identifying new eThreats;
  f. a graphical knowledge-acquisition and maintenance tool that enables the security expert to easily add new patterns to the knowledge base, or modify existing ones; and
  g. an effective visualization interface for alerts notification.

A preferred embodiment of the architecture of the invention comprises the following modules and components that support the two main modes of operation:
  a. Knowledge Acquisition Module (KAM);
  b. Knowledge Base (KB);
  c. KB Access Module (KBAM);
  d. Temporal Abstraction Module (TAM);
  e. Data, Abstractions and raised Alerts storage;
  f. Persistence services module;
  g. Query Module;
  h. Continuous Monitoring Engine;
  i. Temporal Abstraction Controller (TAC);
  j. Visual Exploration Module (VEM);
  k. Alert Invocation Module (AIM); and
  l. Visual Monitoring Module (VMM).

Preferred embodiments of the architecture use the Knowledge-Based Temporal Abstraction (KBTA) method to make temporal abstractions. The architecture preferably supports acquiring multiple security-related ontologies such as a PC ontology, a server ontology, a cellular phones/pocket PC ontology, and network elements, in a flexible way. Preferred embodiments of the architecture enable a distributed, parallel computation for the monitoring and creation of temporal abstractions from given multiple records. Preferably the architecture enables monitoring of eThreat patterns defined in a fuzzy fashion as a set of constraints, rather than an exact signature of each and every known threat, and thereby enables detection of instances of threats that have not been encountered before.

All the above and other characteristics and advantages of the invention will be further understood through the following illustrative and non-limitative description of preferred embodiments thereof, with reference to the appended drawings.

BRIEF DESCRIPTION OF THE DRAWINGS

FIGS. 12A to 12C show examples of the graphical representations used with the Knowledge Acquisition Module;

DETAILED DESCRIPTION OF PREFERRED EMBODIMENTS

Publications and other reference materials referred to herein, including reference cited therein, are incorporated herein by reference in their entirety and are numerically referenced in square brackets in the following text and respectively grouped in the appended Bibliography which immediately precedes the claims.

The invention is an architecture that enables exploration and monitoring of continuously accumulated time-oriented data and meaningful interpretations, known as Temporal Abstractions (TAs), to be derived from the data Herein the architecture of the invention will be identified by the acronym eTIME (Electronic Time-oriented Intelligent Monitoring and Exploration).

eTIME is a comprehensive conceptual and computational architecture that supports two main modes of operation:

(1) An automated, continuous mode for monitoring, recognition and detection of known eThreats.

(2) An interactive, human-operated intelligent tool for dynamic exploration of the contents of a security storage service to identify new temporal patterns that characterize such threats, and to add them to the monitoring database.

Figure 1:
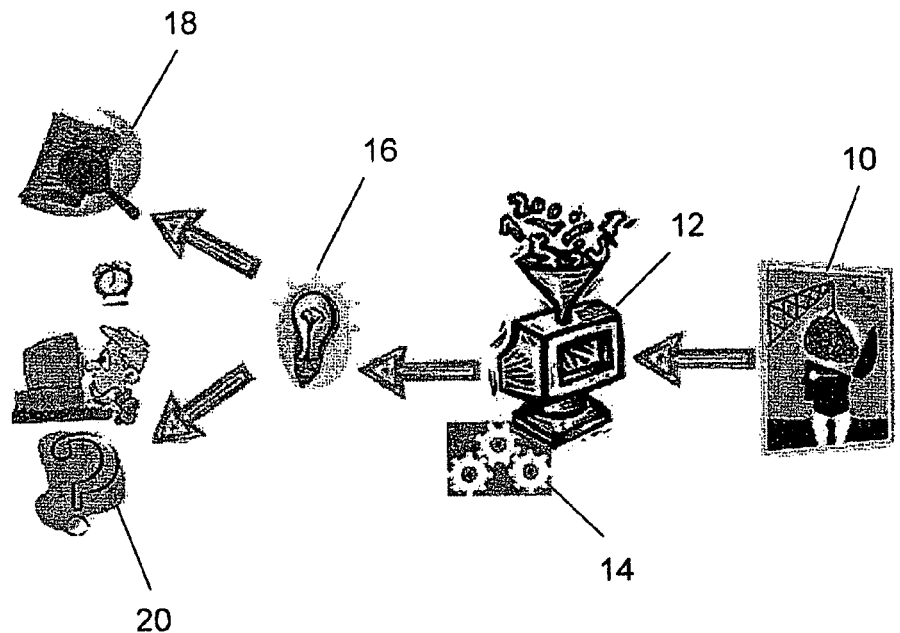
FIG. 1 shows symbolically the task of Temporal Abstraction.

The eTIME architecture integrates:

a. a set of time-oriented security data sources;

b. a set of one or more knowledge bases specific to the process of detecting meaningful temporal patterns of not only raw data but also higher-level, abstracted concepts;

c. a temporal abstraction computational process that creates abstract patterns such as eThreats from the integration of the data and knowledge;

d. a monitoring service that continuously applies the relevant security knowledge to the accumulating data;

e. an effective visualization interface for exploration of multiple security-oriented records and their correlations over time, thus supporting also an interactive mode that enable identifying new eThreats;

f. a graphical knowledge-acquisition and maintenance tool that enables the security expert to easily add new patterns to the knowledge base, or modify existing ones; and g. an effective visualization interface for alerts notification.

eTIME can analyze data collected from various sources, such as end-user devices, network element, network links etc., to identify potentially infected devices, files, substreams or network segments.

eTIME is based on the use of a type of Temporal Reasoning (TR) task known as Temporal Abstraction (TA). The task of TA is symbolically shown in FIG. 1. A computational mechanism 14 integrates raw time-stamped data 12, collected from the network and end-user devices, and temporal abstract knowledge 10, to extracted meaningful high level interpretations known as Temporal Abstractions (TAs) 16 in order to identify patterns of eThreats. The TAs 16 can be automatically monitored 18 and explored and queried 20 to detect predefined "interesting" patterns.

eTIME uses the Knowledge-Based Temporal Abstraction (KBTA) method to solve the TA task. In the KBTA method, developed by one of the inventors of the present invention [1] and [2], the security ontology is based on five KBTA entities (also called classes) and the relations between them. The five entities are: Primitive parameters, Abstract parameters, Contexts, Events, and Patterns. Five inference mechanisms are used for deriving the high level abstractions from the raw data. The inputs to these five mechanisms are the primitive parameters and the events, which are related to raw data and the outputs are contexts, events and patterns. These entities and the inference mechanisms are described in detail hereinbelow.

The Five Entities:

Primitive Parameters are raw measurable data of the security domain collected from different sensors. Examples of primitive parameters are CPU usage and the number of running process on a machine or a link load.

There are two types of primitive parameters: Quantitative and Qualitative. A Quantitative parameter is a parameter with numerical, ordinal values and defined measurement units, e.g. such as % or Mbps. A Qualitative parameter is a parameter with a list of possible values. For example the parameter "Operation System" with the following values: Windows, Unix, Linux etc.

Events are raw data of the security domain as well, and they are actions taken by a system or a user, for example: opening a browser, installing a service pack or rebooting a server.

Contexts are the "state of affairs" over a time interval. Contexts affect the interpretation of parameters. The same data-set may be interpreted differently within different contexts. For example, the same number of opening connections may be interpreted as Normal within the "user activity" context and Very-High within the "no user activity" context.

Abstract parameters are derived from one or more parameters (primitive or abstract). An Abstract parameter requires a mapping function that maps the values of the abstracted-from parameters to the values of the abstracted parameter.

For example, GIF download_STATE is an abstract parameter that is abstracted-from the primitive parameter number of downloaded GIFs. GIF download_STATE values might be: Normal, High, or Very High, and the mapping function can map, for example, 0-4 downloaded GIFs to a Normal value.

A context is required in order to derive an Abstract parameter. This means that within different contexts, an Abstract parameter will have different mapping functions and may result in different values.

There are three types of Abstract parameters: State, Gradient and Rate. A State parameter (as described hereinabove) maps the values of the abstracted-from parameters to a state-describing set of values. A Gradient parameter determines the changing direction of the measured parameter (increasing, decreasing or steady). A Rate parameter determines the rate of change of a selected parameter (fast, slow).

The objective of KBTA is to derive, for each abstraction, the longest possible time interval from the raw data with the same value. Each primitive parameter can be abstracted-into at least three abstractions: State, Gradient, and Rate.

Figure 2:
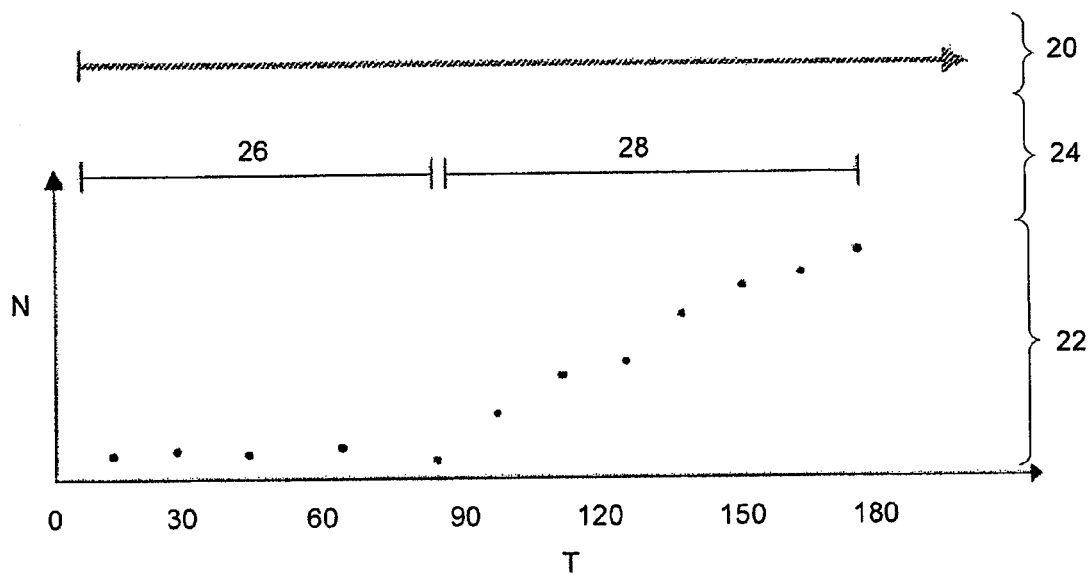
FIG. 2 illustrates an example of abstracting a Gradient parameter.

FIG. 2 illustrates an example of abstracting a Gradient parameter. The number N of downloaded GIFs, measured on a specific personal computer, is shown plotted vs. the time T measured in minutes. The raw data 22 representing primative parameter N is abstracted 24 within the Internet connection mode context 20 into two time intervals, one 26 is steady and the second 28 is increasing.

Patterns:

Patterns are complex sets of value and time constrains defined over a set of parameters (primitive and abstract), events and contexts. There are two types of constraints: global and local. A Global constraint is defined over two concepts, for example event B occurred 4 days after abstraction A. A Local constraint is defined on one concept, for example concept A is at least 4 hours long.

Figure 3:
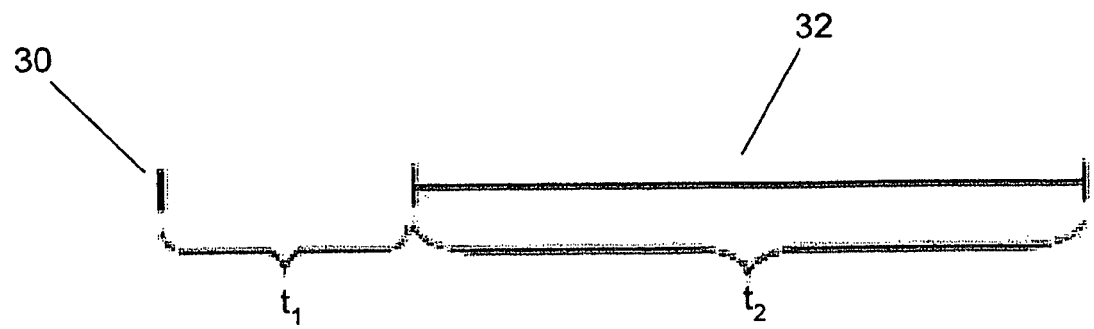
FIG. 3 illustrates an example for a pattern.

FIG. 3 illustrates an example for a pattern. Application installation on a cellular phone 30 is followed within a period of time $t_1 \leqq 5$ min by high outgoing traffic for a period $t_2 \geqq 20$ min. In this example The outgoing traffic 32 is a state abstraction and the fact that the state abstraction is high for at least 20 minutes is a local restraint.

There are two types of patterns. A Linear pattern occurs only one time. A Repeating pattern is a linear pattern that has occurred two or more times (for example, the pattern shown in FIG. 3 occurring 4 times in one week).

Table 1 summarizes the five KBTA entities and their relationships

TABLE 1

| | Entity (is-a) | Children relation | Parent relation | Context relation | Example |
|---|---|---|---|---|---|
| 1 | Primitive Parameter | | abstracted-into | generated-contexts | CPU usage |
| 2 | Abstract parameter | abstracted-from | abstracted-into | generated-contexts | GIF download_GRADIENT |
| 3 | Event | Parts | part-of | generated-contexts | Open browser |
| 4 | Context | sub-context | super-context | generated-from | Installation context |
| 5 | Pattern | components | component-of | generated-contexts | worm alert |

In order to compute the higher level abstractions from a given raw data repository, the KBTA uses five inference mechanisms: Temporal Context Formation, Contemporaneous Abstraction, Temporal Inference, Temporal Interpolation, and Temporal Pattern Matching.

Figure 4:
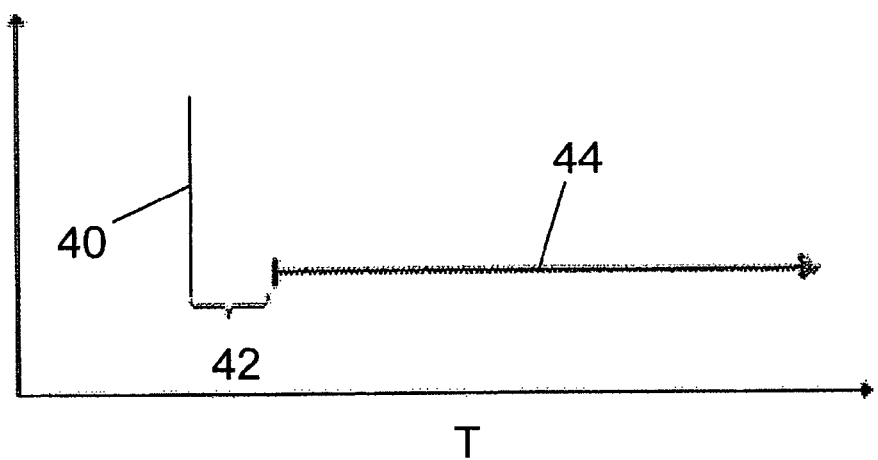
FIG. 4 illustrates an example of a Temporal Context Formation.

Temporal Context Formation creates interpretation-context intervals that enable the TA mechanisms to create context-specific abstractions. This mechanism requires context-induction knowledge such as the concepts that generate the context and the start, end, and duration of the context. FIG. 4 illustrates an example of a Temporal Context Formation. In the example the internet connection is made 5 seconds after the browser is open and is maintained until the browser is closed. This is shown schematically in FIG. 4 wherein Browser open event 40 takes place at time $t_0$ and after a certain interval 42 (in this case 5 sec.) the internet connection mode context 44 is generated.

A context can be created backwards (into the past). This is important since it can be very helpful in tracing-back the source of an attack. For example, if it is known that at some point a server has encountered an attack, an attack context can be generated from the time it was discovered and backwards for a predetermined temporal duration. That will cause re-inspecting the historical data and might create new abstractions that can lead to the source; for example, an installation from an outside source that didn't seem suspicious before, might now look suspicious within the new attack context.

Figure 5:
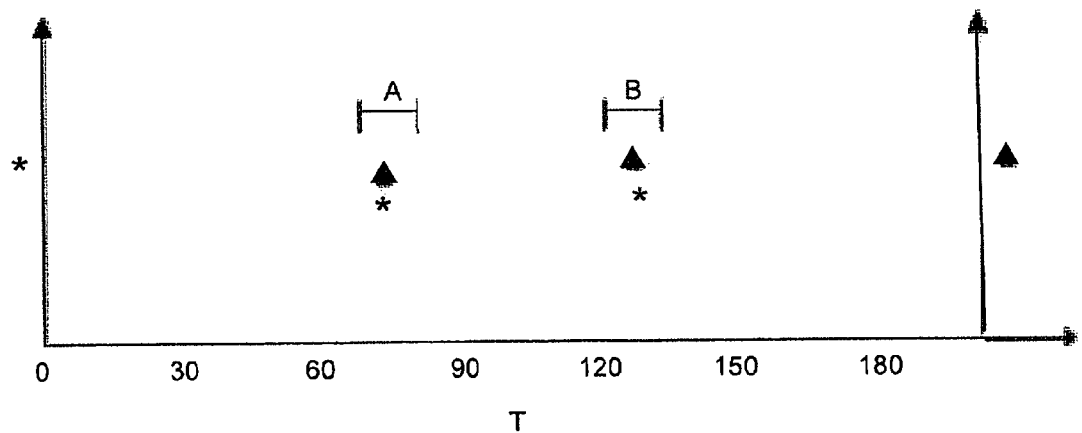
FIG. 5 illustrates an example of Contemporaneous Abstraction.

Contemporaneous Abstraction involves abstracting from one or more parameters occurring simultaneously into a higher level abstraction (State, Gradient or Rate). The time interval of the derived fact is the intersection of the base parameter facts, and the value is the result of applying classification function on the base parameter facts. FIG. 5 illustrates an example of Contemporaneous Abstraction. The figure shows the values of two Primitive Parameters vs. time T measured in this case in minutes. The Primitive Parameters are: The number of files in the registry run, symbolized by * and plotted using the scale on the left vertical axis, and the number of files in the startup folder, symbolized by ▲ and plotted using the scale on the right vertical axis. The two Primitive Parameters are mapped to a higher level, state parameter, i.e. the total number of running files which can be Normal, High or Very High. Note that, in the example, the abstraction is a time point and not an interval and that for the two sample times A and B, the state parameters values are High.

Figure 6:
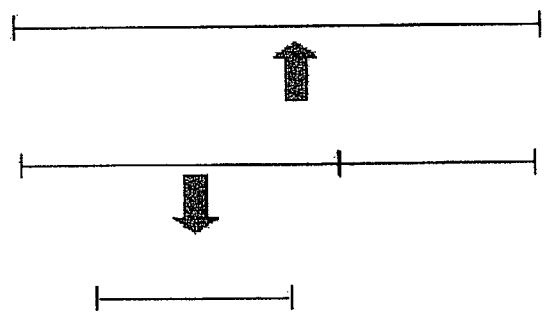
FIG. 6 illustrates how the temporal inference mechanism uses the temporal semantic properties of a concept to derive new abstractions.

Temporal Inference is inference from similar-type propositions that hold over different time intervals according to the temporal semantic properties (concatenable, downward hereditary, gestalt, solid, forward/backward diffusive). The semantic properties are part of the concept's knowledge. For example, by using the concatenable property, the temporal inference can join similar-value abstractions of the same parameter that hold over two meeting time intervals. The downward-hereditary property is useful in answering queries and it states whether one can conclude that if a predicate is true over some time interval than it is true over any contained interval. FIG. 6 illustrates how the temporal inference mechanism uses the temporal semantic properties of a concept, such as the concatenable and downward hereditary properties, to derive new abstractions. The length of the horizontal bar in |----| represents the value of a state parameter, in this case Total Running Files_STATE (High). The middle level represents the original abstraction, which is two separate state parameters; the upper level represents the new abstraction derived from the original one by using the concatenable properties; and the lower level represents the abstraction derived from the original by using the downward hereditary property.

Temporal Interpolation is the bridging of gaps between temporally disjoint point-based or interval-based facts of a similar-type (but potentially different values) to create longer intervals, e.g., joining two temporally disjoint high CPU usage intervals into a longer interval. This mechanism requires temporal semantic knowledge and interpolation knowledge that can tell, for example, what the maximal gap is that enables concatenation of two point based facts.

Temporal Pattern Matching creates complex temporal pattern intervals. It requires pattern classification knowledge such as what are the components of the pattern and what are the value and time constraints.

Table 2 lists an example of basic security ontology with the concept's type, name and related concepts. The list contains parameters, events, contexts, and patterns. In the relations column we can see the related concepts (by row number) and pattern definition.

TABLE 2

| | Entity | Concept Name | Relations |
|---|---|---|---|
| 1 | Primitive | Executables number | |
| 2 | State | Executables number_STATE | Abstracted-from: (1) Necessary-context: (42) |
| 3 | Gradient | Executables number_GRADIENT | Abstracted-from: (1) |
| 4 | Rate | Executables number_RATE | Abstracted-from: (1) |
| 5 | Primitive | Executables number changed in day | |
| 6 | State | Executables number changed in day_STATE | Abstracted-from: (5) |
| 7 | Gradient | Executables number changed in day_GRADIENT | Abstracted-from: (5) |
| 8 | Rate | Executables number changed in day_RATE | Abstracted-from: (5) |
| 9 | Primitive | GIF downloaded | |
| 10 | State | GIF downloaded_STATE | Abstracted-from: (9) |
| 11 | Gradient | GIF downloaded_GRADIENT | Abstracted-from: (9) |
| 12 | Rate | GIF downloaded_RATE | Abstracted-from: (9) |
| 13 | Primitive | IP Access | |
| 14 | Gradient | IP Access_GRADIENT | Abstracted-from: (13) |
| 15 | Primitive | IP Access amount | |
| 16 | State | IP Access amount_STATE | Abstracted-from: (15) |
| 17 | Gradient | IP Access amount_GRADIENT | Abstracted-from: (15) |
| 18 | Rate | IP Access amount_RATE | Abstracted-from: (15) |
| 19 | Primitive | Registry Run | |
| 20 | State | Registry Run_STATE | Abstracted-from: (19) |
| 21 | Gradient | Registry Run_GRADIENT | Abstracted-from: (19) |
| 22 | Rate | Registry Run_RATE | Abstracted-from: (19) |
| 23 | Primitive | Registry Shell | |
| 24 | State | Registry Shell_STATE | Abstracted-from: (23) |
| 25 | Gradient | Registry Shell_GRADIENT | Abstracted-from: (23) |
| 26 | Rate | Registry Shell_RATE | Abstracted-from: (23) |
| 27 | Primitive | Sent repeated content | |
| 28 | State | Sent repeated content_STATE | Abstracted-from: (27) |
| 29 | Gradient | Sent repeated content_GRADIENT | Abstracted-from: (27) |
| 30 | Rate | Sent repeated content_RATE | Abstracted-from: (27) |
| 31 | Primitive | StartUp folder | |
| 32 | State | StartUp folder_STATE | Abstracted-from: (31) |
| 33 | Gradient | StartUp folder_GRADIENT | Abstracted-from: (31) |
| 34 | Rate | StartUp folder_RATE | Abstracted-from: (31) |
| 35 | Primitive | System wide hook | |
| 36 | State | System wide hook_STATE | Abstracted-from: (35) |
| 37 | Gradient | System wide hook_GRADIENT | Abstracted-from: (35) |
| 38 | Rate | System wide hook_RATE | Abstracted-from: (35) |
| 39 | Primitive | Total Auto Files | |
| 40 | Gradient | Total Auto Files_GRADIENT | Abstracted-from: (39) |
| 41 | Event | Boot Strap | |
| 42 | Context | Boot_Context | Generated-from: (41) |
| 43 | Event | Browser Open | |
| 44 | Context | Internet Connection Mode | Generated-from: (43) |
| 45 | Event | Not Installation Process | |
| 46 | Context | Installation_Context | Generated-from: (45) |
| 47 | Event | Mail Attachment Executed | |
| 48 | Context | Mail Attachment Executed_Context | Generated-from: (47) |
| 49 | Event | WAB Access | |
| 50 | Context | WAB Access_Context | Generated-from: (49) |
| 51 | Pattern | Adware Alert | Components: (54), (10), (11) (54) = 'true' AND [(10) = 'very_high' OR (11) = 'inc'] |
| 52 | Pattern | File Virus Alert | Components: (7) DURING last week (7) = 'inc' |
| 53 | Pattern | IP Scan Alert | Components: (17) AT LEAST 10 min (17) = 'inc' |
| 54 | Pattern | Malware injection alert | Components: (43), (40), (45), (3) (43) = 'true' AND (45) = 'true' AND (3) = 'inc' AND (40) = 'inc' |
| 55 | Pattern | Spyware Alert | Components: (54), (37) (54) = 'true' AND AFTER 10 sec (37) = 'inc' |
| 56 | Pattern | Worm Alert | Components: (47), (49), (28) (47) = 'true' AND (49) = 'true' AND (28) = 'very_high' |

To conclude, the architecture of the invention uses the KBTA method to integrate the raw, time-oriented security data from various data sources with knowledge acquired according to the KBTA method in order to derive meaningful information that can be explored and monitored (contexts, abstractions and patterns).

Figure 7A:
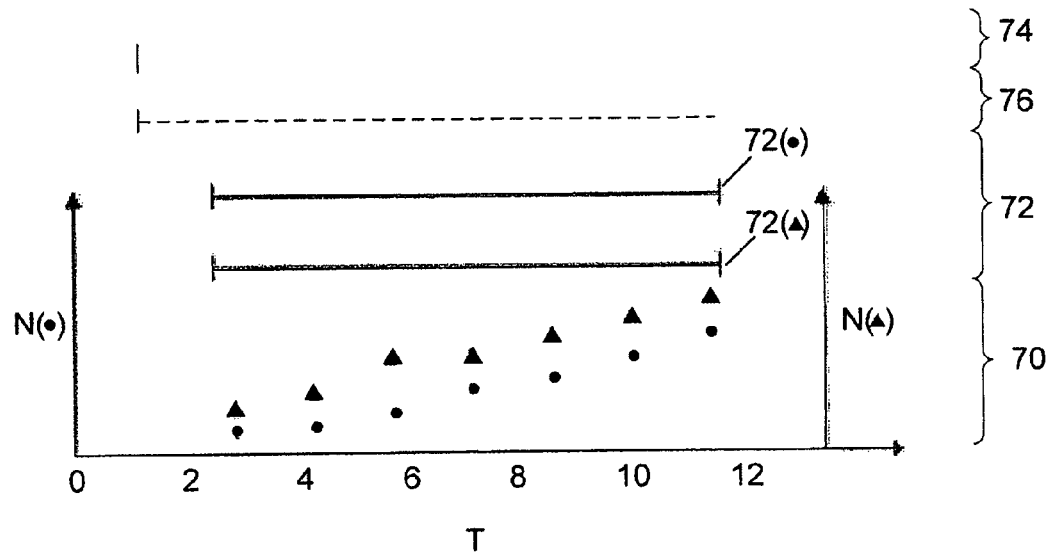
FIGS. 7A and 7B show, using different graphical representations, an example of the use of KBTA to detect a malware injection pattern.
Figure 7B:
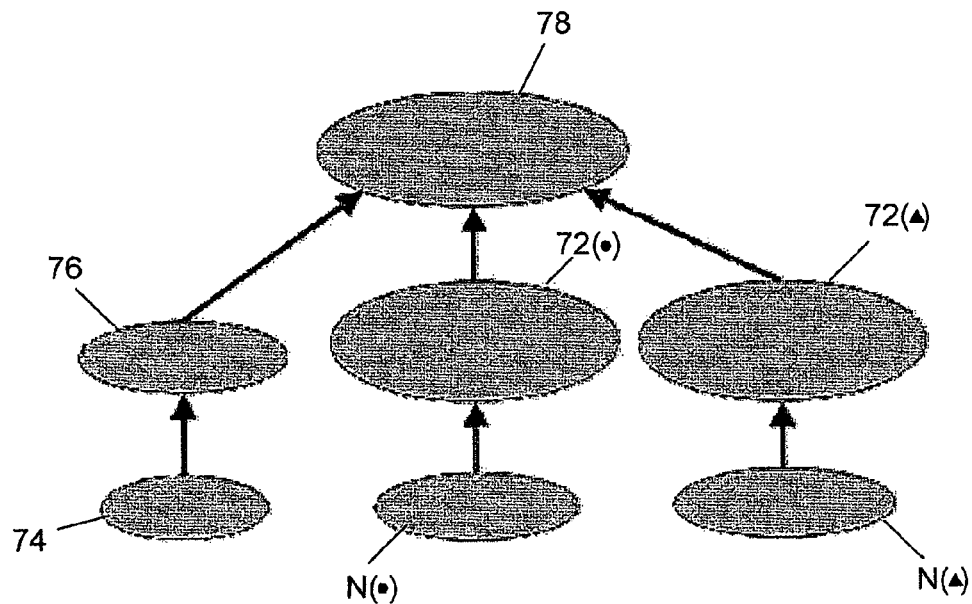

An example of the use of KBTA to detect a malware injection pattern is shown in two different graphical forms in FIGS. 7A and 7B. Raw data 70 are plotted at the bottom and events and the abstractions computed from the data are plotted as intervals above the data. The raw data comprises two primitive parameters: the total number of auto files running N(●) and the total number of executable files running N(▲). These are abstracted into the two abstractions 72: Total auto files GRADIENT[Increasing] 72(●) and Executable Number GRADIENT[Increasing] 72(▲). An event 74, in this case the Browser open event leads to the generated context Internet connection mode 76. In FIG. 7A, |----|=an event interval and |-|=an abstraction (derived concept) interval. A malware injection pattern 78 is created IF during an Internet connection (e.g. opening and working in Internet Explorer browser) there is an increasing of the amount of auto files, (i.e. files executed on restart by the Operating System and in Startup folder) AND there is an increasing of the amount of executed files AND no installation process is taking place.

The main tasks of eTIME are to enable the manual visual exploration of raw security data, and to automatically monitor the raw and abstracted data in order to detect eThreat patterns. In order to enable the run-time monitoring and exploration mode, eTIME has to be setup. In the setup phase there are three essential tasks:

Building the KBTA security ontology;

Enable accessing heterogeneous data sources, e.g. other security programs that are running on the same network, including the process of mapping the KB (Knowledge Based) terms to the data source terms; and Static monitoring customization (i.e. determining which patterns to monitor).

At run-time eTIME will enable the following tasks:

Support maintenance and exploration of the KBTA security ontology;

Computational architecture that continuously creates new abstractions from a stream of time-stamped raw data (parameter measurements and events) based on the security ontology;

Support single subject queries (e.g. server #123) and multiple subject queries (e.g. all servers in the marketing department);

Support visual exploration interface for querying and exploring raw and abstracted security data;

Support automated continuous monitoring of the abstracted data and creation of alerts;

Enable run-time monitoring initiation and customization (invoking alerts); and

Support visual monitoring interface for alert notification and browsing.

Figure 8:
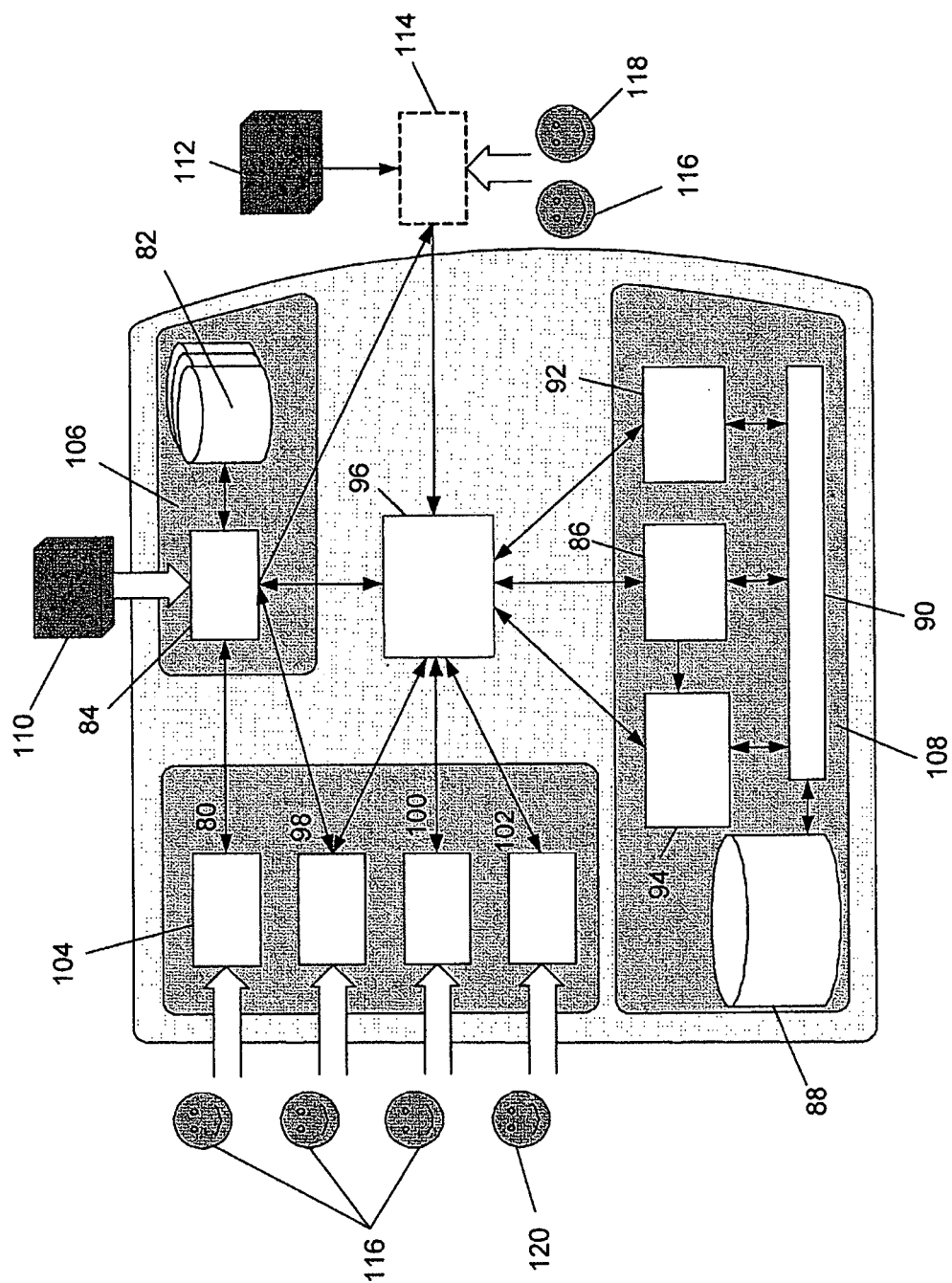
FIG. 8 schematically shows the eTIME framework.

The eTIME framework is shown schematically in FIG. 8. It consists of the following modules and components that support the settings, monitoring and exploration tasks:

(1) Knowledge Acquisition Module (KAM) 80—user application for maintaining and exploring the KBTA security ontology and for defining monitored patterns.

(2) Knowledge Base (KB) 82—the security ontology repository. All concepts and the relations between them are stored in the KB, as well as the definition of all monitored patterns.

(3) KB Access Module (KBAM) 84—the access point to the KB. Updating the KB and reading from the KB is done only by the KBAM.

(4) Temporal Abstraction Module (TAM) 86—the computational mechanism which integrates the raw security data records with the knowledge and computes the abstractions.

(5) Data, Abstractions and raised Alerts storage 88—stores all raw data records, derived abstractions and raised alerts.

(6) Persistence services 90—provides persistence services.

(7) Query Module 92—answers queries using the data and abstractions storage.

(8) Continuous Monitoring Engine (CME) 94—monitors the computational services output to detect eThreats patterns.

(9) Temporal Abstraction Controller (TAC) 96—handles queries requests and synchronizing the integration of data and knowledge.

(10) Visual Exploration Module (VEM) 98—a graphical user application for exploration of both raw and abstracted data.

(11) Alert Invocation Module (AIM) 100—a graphical user application for activating and de-activating alerts.

(12) Visual Monitoring Module (VMM) 102—a graphical user interface for alert notification.

The framework shown in FIG. 8 is conveniently divided into four distinct groups according to the function of each groups elements. The groups are:

(1) User applications 104;
(2) KB manager 106;
(3) Continuous monitoring and querying 108; and
(4) Elements that are external to, but provide input into eTIME or use its output.

The external elements include data sources 110 and 112, a module for performing the mapping process of the data provided by external sources to the eTIME schema 114, and security experts 116, data source manager 118, and security officer 120.

The security expert 116 uses the Knowledge Acquisition Module 80 to maintain and explore the security ontology stored in the knowledge-base 82. The KAM 80 also enables static monitoring customization. The user will be able to maintain a library of monitored patterns definition such as: Adware pattern that last more than 24 hours; or, worm pattern detected on more than 15% of the computers. The user will be able to define various attributes for the defined alerts such as the severity level.

Figure 9:
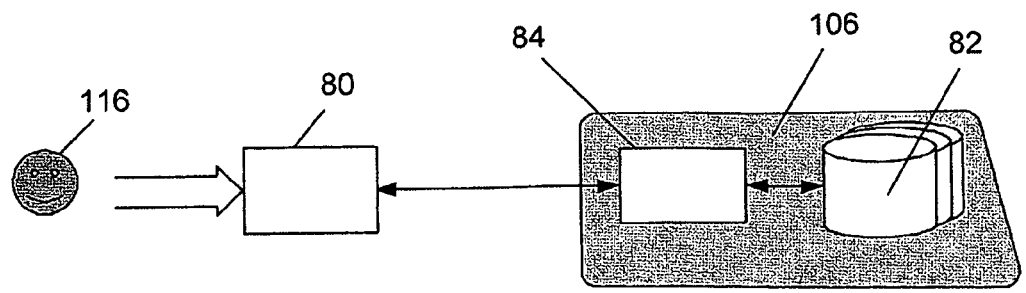
FIG. 9 shows the process of maintaining and exploring the KBTA security ontology and updating the monitored patterns definition.
Figure 10:
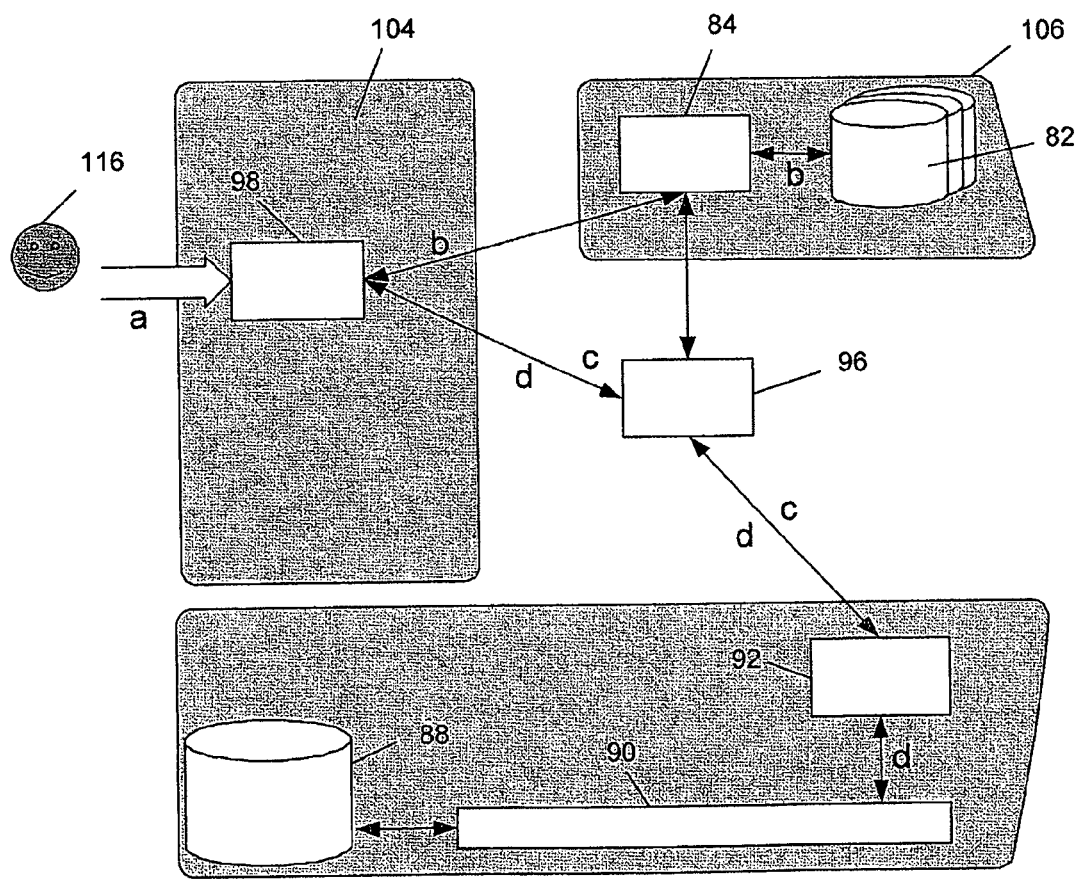
FIG. 10 shows the process of visual exploration.

The KB Access Module 84 retrieves the security ontology from the KB 82, and forwards it to the user's Knowledge Acquisition Module 80. Then, the security expert 116 updates the ontology or the defined monitored patterns. The changes are returned to the KB Access Module 84 that updates the KB 82. This process of maintaining and exploring the KBTA security ontology and updating the monitored patterns definition is shown in FIG. 9.

eTIME supplies a unified schema, and any data source that complies with this schema can be explored and monitored by eTIME. In order that a data source will comply with the eTIME schema, a mapping process is necessary. In the mapping process, the data source manger 118 with the assistance of the security expert 116, maps the data source terms and units to corresponding terms and units in the KB 82. Then, at run-time the raw data records are processed to the format of the eTIME schema At any time, the security expert 116 can explore the raw data and the temporal abstractions derived from it by applying the knowledge contained within eTIME to the raw data. The process of visual exploration is shown in FIG. 10.

By using the Visual Exploration Module 98, the security expert 116 can submit time-oriented queries, e.g. all machines on which an executable email attachment was executed, followed by High CPU usage for at least 10 minutes or, all Trojan horse patterns that have appeared in the last two months on computer #246. The query submission is based on the security ontology which is retrieved by the KB Access Module 84 and presented to the user. The Temporal Abstraction Controller 96 receives the query from the Visual Exploration Module 98 and forwards the query to the Query Module 92, which uses the data and abstractions repository 88 to answer the query. The answer is returned to the controller 92, and then to the exploration module 98. In FIG. 10, the arrow labeled a represents the flow of query parameters from the security expert 116 and the visualization of the returned results. Double headed arrows b, c, and d represent the flow of knowledge, queries, and results respectively.

Figure 11:
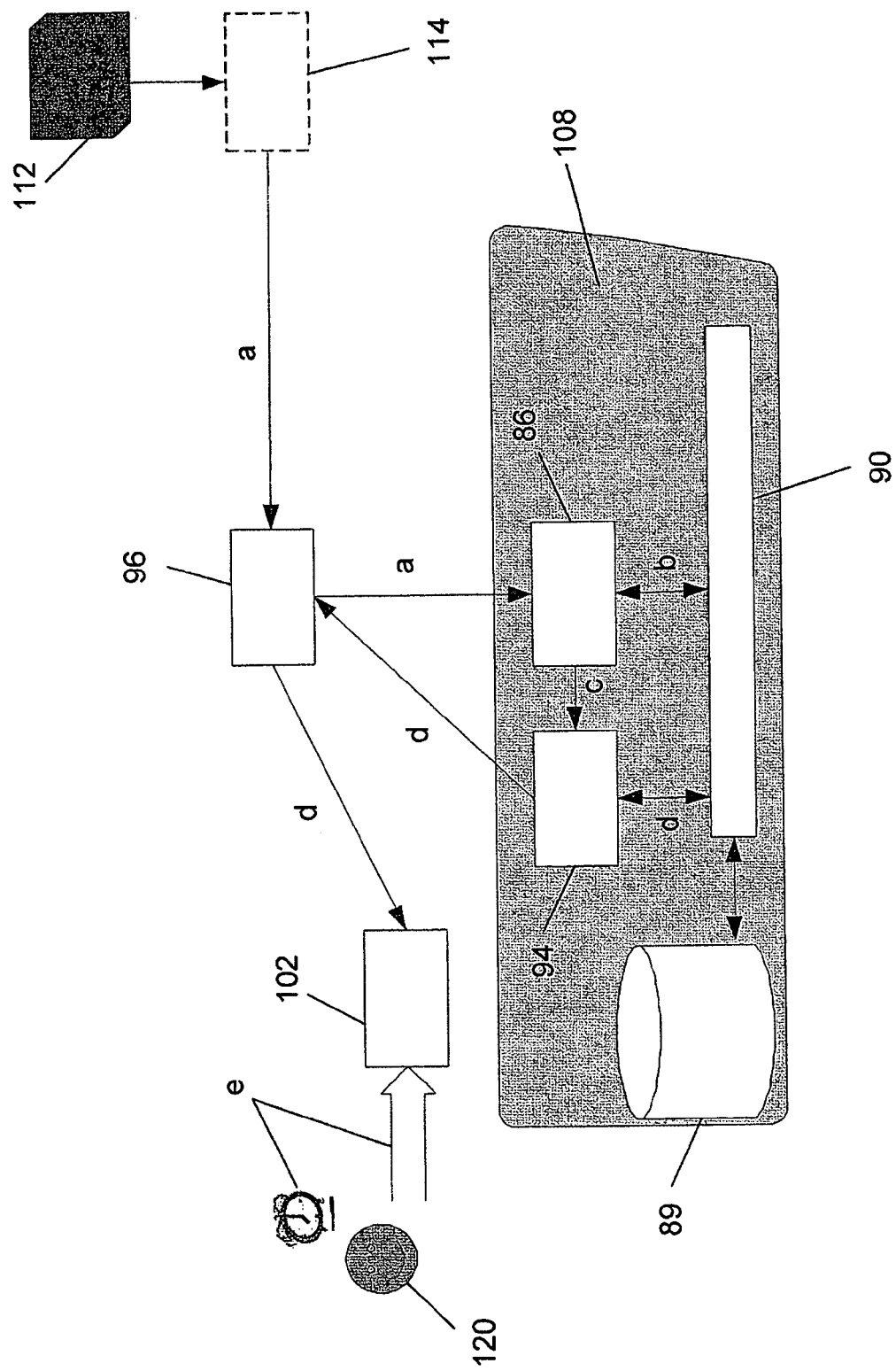
FIG. 11 shows the monitoring process.

Monitoring is applied on temporal abstractions created by the Temporal Abstraction Module 86 whenever new raw data becomes available. The monitoring process is shown in FIG. 11. The Temporal Abstraction Controller 96 continuously, receives new raw data records from the data source 112, and sends the new data records to the Temporal Abstraction Module 86. The TA Module 86 derives new abstractions from the new raw data. The new raw data and abstractions are stored in the data and abstractions storage 89. The new abstractions are sent to the Continuous Monitoring Engine 94 for monitoring. Once a defined monitored pattern is detected, the monitoring module 94 sends an alert event to the controller 96, and the controller 96 informs the security officer 120 using the Visual Monitoring Module 102. In FIG. 11, arrows a, b, c, d, and e represent the flow of new raw data, raw data and abstractions, new abstractions, raised alerts, and visual (or audible) raised alerts respectively.

A more detailed description of the operation of some of the eTIME modules shown in FIG. 8 will now be given.

The Knowledge Acquisition Module (KAM) 80 enables the security expert 116 to acquire the security ontology and to maintain the security knowledge-base according to the KBTA method. It provides a convenient user interface for adding, updating and deleting concepts (parameters, events, contexts and patterns) and the relations between the concepts. The acquired ontology can be saved locally or on the KB server through the KB Access Module 84. Updating the ontology on the KB server can be done only by authorized users.

Figure 12A:
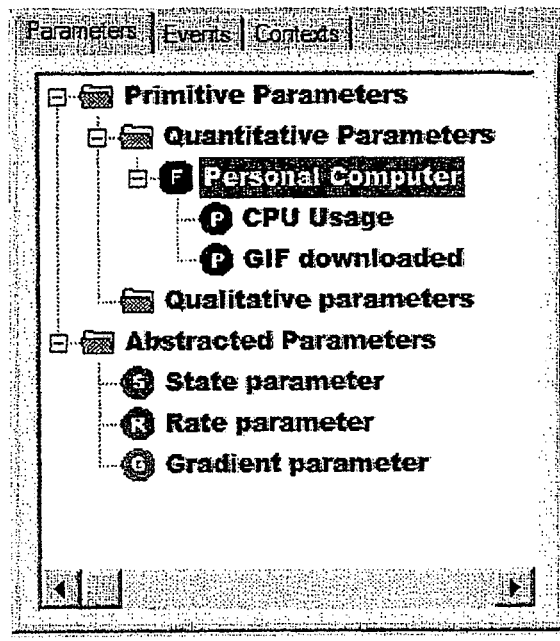
Figure 12B:
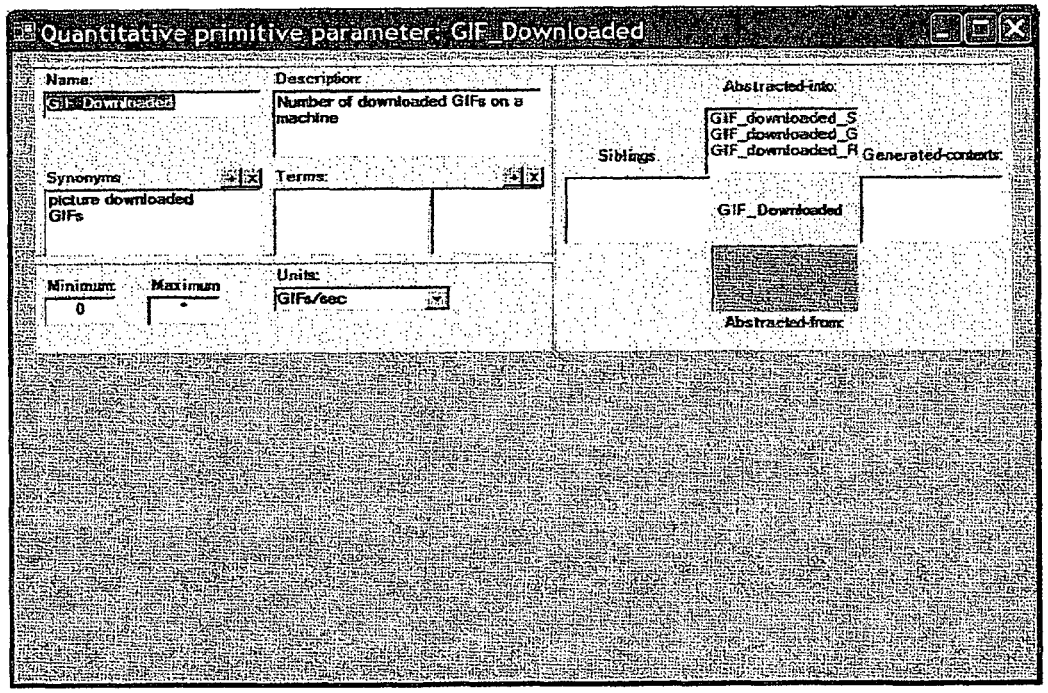
Figure 12C:
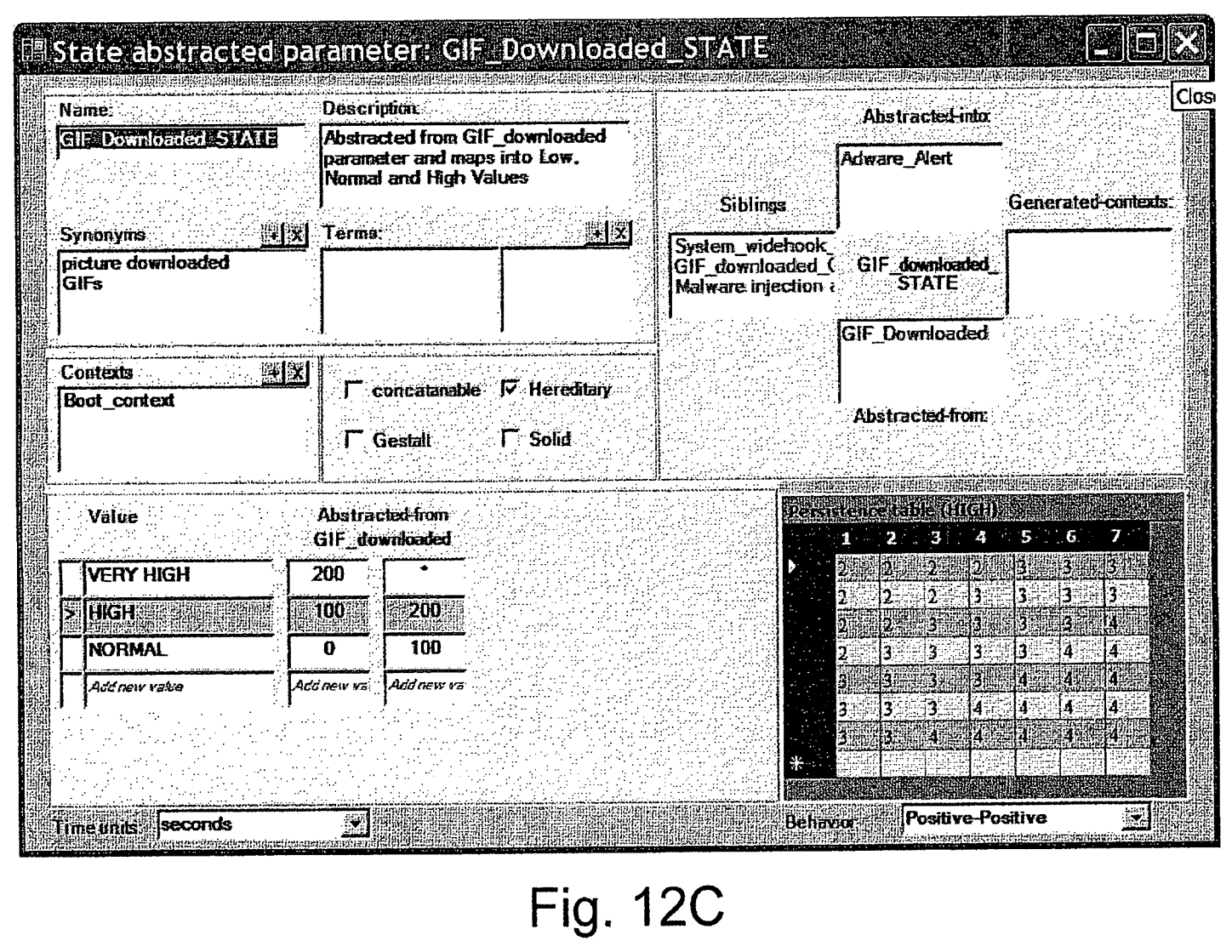

The KAM 80 supports a graphical tree representation of the ontology and each concept will have a dedicated form with all relevant data input fields. Examples of the graphical representations used with the Knowledge Acquisition Module 80 are shown in FIGS. 12A to 12C. FIG. 12A is an example of a parameters tree representation. Each entity (parameters, events, contexts and patterns) has a tree in different tab and different icons. A user can add a folder to the tree to group concepts. FIGS. 12B and 12C show examples of a primitive parameter form and a state parameter form respectively.

The security expert 116 is able to create a new ontology, based on a previously defined ontology, by including the existing ontology to the new one (without the ability to change it). For example he might want to create basic security ontology and inherit it to a more specific ontology such as cellular phone security.

The KAM 80 is used for defining a library of monitored patterns. That is done by defining constraints over patterns that are part of the ontology, for example: an adware pattern that lasts for more than 24 hours or a virus pattern detected on more than 25% of the computers.

The Knowledge-Base Access Module (KBAM) 84 is the Application Program Interface (API) to a set of one or more security knowledge-bases specific to the process of detecting meaningful temporal patterns of not only raw security-related data, but also of higher-level, abstract concepts, such as complex eThreat types. The KBAM enables searching the KB 82 and retrieving knowledge information (concepts and relationships between the concepts) as well as updating the KB.

Figure 13:
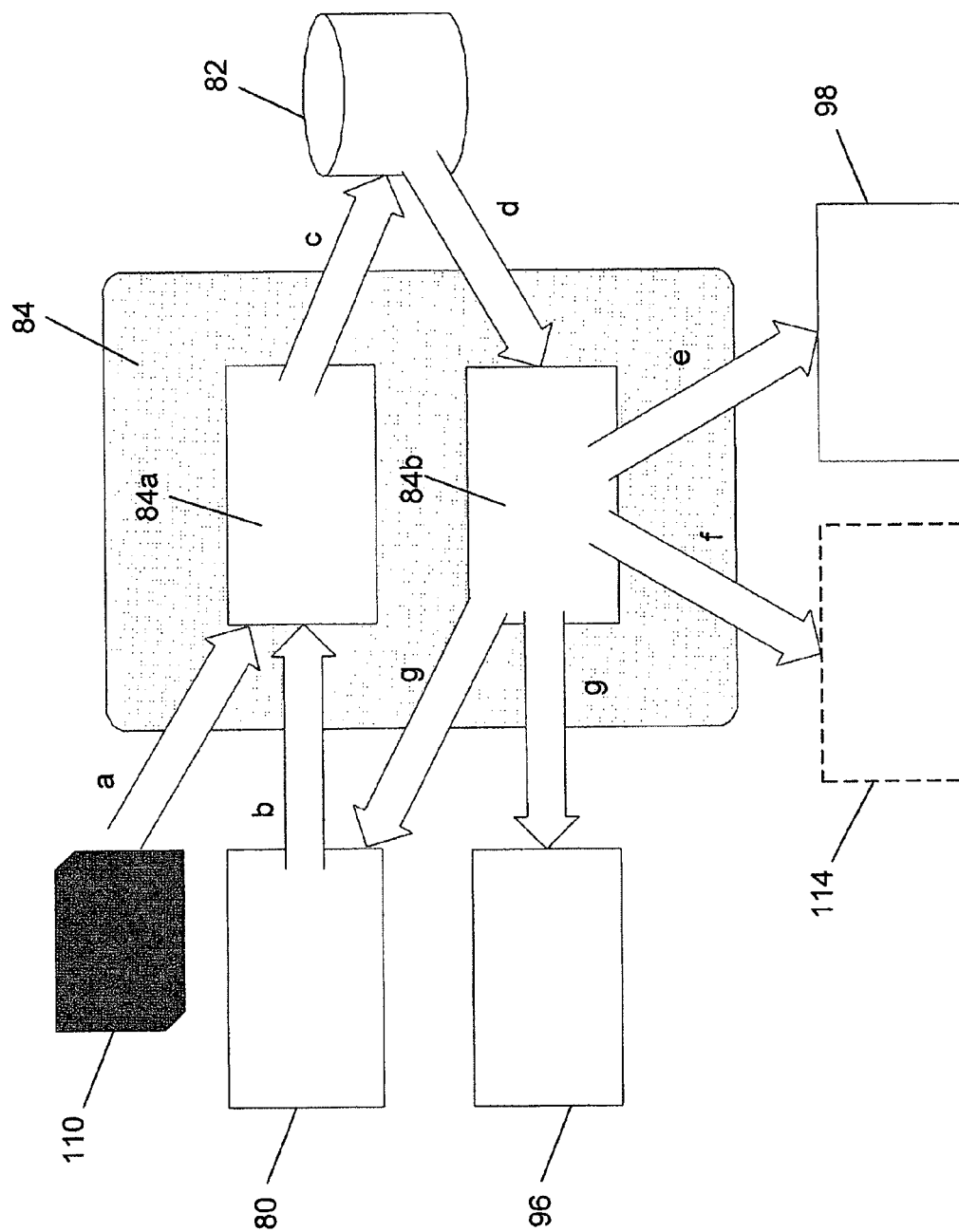
FIG. 13 shows the KBAM's components and interfaces with other modules.

FIG. 13 shows the KBAM's components and interfaces with other modules. The KB Update Service 84a receives updated concepts coming from other modules, e.g. updated ontology from the Knowledge Acquisition Module 80 or new patterns discovered by the ITDM 110, and updates the KB 82. The KB Search & Retrieval Service 84b receives requests for knowledge from various modules, retrieves the relevant knowledge, and returns it to the source. The KBAM components also handle the authentication of users requesting or updating knowledge and the validation of the KB update requests. The arrows in FIG. 13 represent the following flows of information: new detected patterns a, updated ontology/monitored patterns definitions b, updating the KB c, results d, ontology e, requested concepts f, and ontology/defined monitored patterns g.

The Query Module 92 receives queries according to a pre-defined query language and returns the results using the Data, Abstractions and raised Alerts storage 88.

The Query Module 92 should be able to answer queries regarding:
  Raw data and abstraction of single subject
  Raw data and abstraction of multiple subjects
  Raised alerts The goal of the continuous monitoring is to provide an integrated environment for the continuous abstraction and monitoring of time-oriented security data that will enable detection of important abstractions and patterns, and notifying the security officer. The main components of the monitoring process are the Temporal Abstraction Module 86 and the Continuous Monitoring Engine 94.

The security domain features large numbers of continuously arriving time-oriented data. The current data may change the interpretation of future data and previous data. For example suspicion of the existence of a Trojan horse should focus on monitoring outgoing File Transfer Protocol (FTP) connections, but also should trigger re-inspection of past data to trace back the source.

The propose approach, that is used in eTIME is the Incremental Temporal-Abstraction, in which the monitoring starts with incremental assertion of the continuously arriving data. The incremental abstraction applies the abstraction process only to the newly arrived data by ensuring "truth maintenance" (which means that previously generated abstractions are updated only when new contradictory data arrives) and "persistence maintenance" (which means that every generated abstraction is retained until updated or removed by the truth maintenance). The incremental approach supports an effective monitoring process since most of the abstractions are pre-computed and there is no need to generate abstract concepts on the fly.

Figure 14:
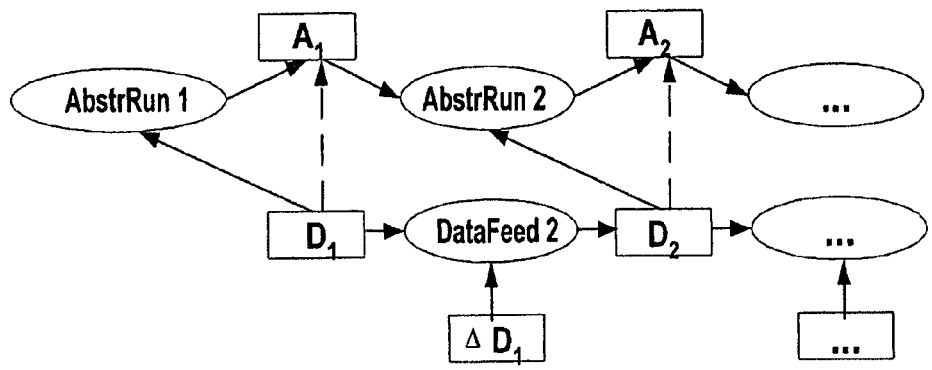
FIG. 14 schematically demonstrates the iterations of the I-KBTA Method.

The incremental temporal abstraction extends the KBTA method to the Incremental KBTA (I-KBTA) [5]. FIG. 14 schematically demonstrates the iterations of the I-KBTA Method. The first iteration of the abstraction process (AbstrRun1) is initiated by the initial raw data feed D1. AbstrRun1 abstracts D1 into A1. Subsequent iterations of the abstraction process are based on the previously created abstractions. The solid arrows represent an input/output to/from process and the broken arrows represent "abstracted into".

Figure 15:
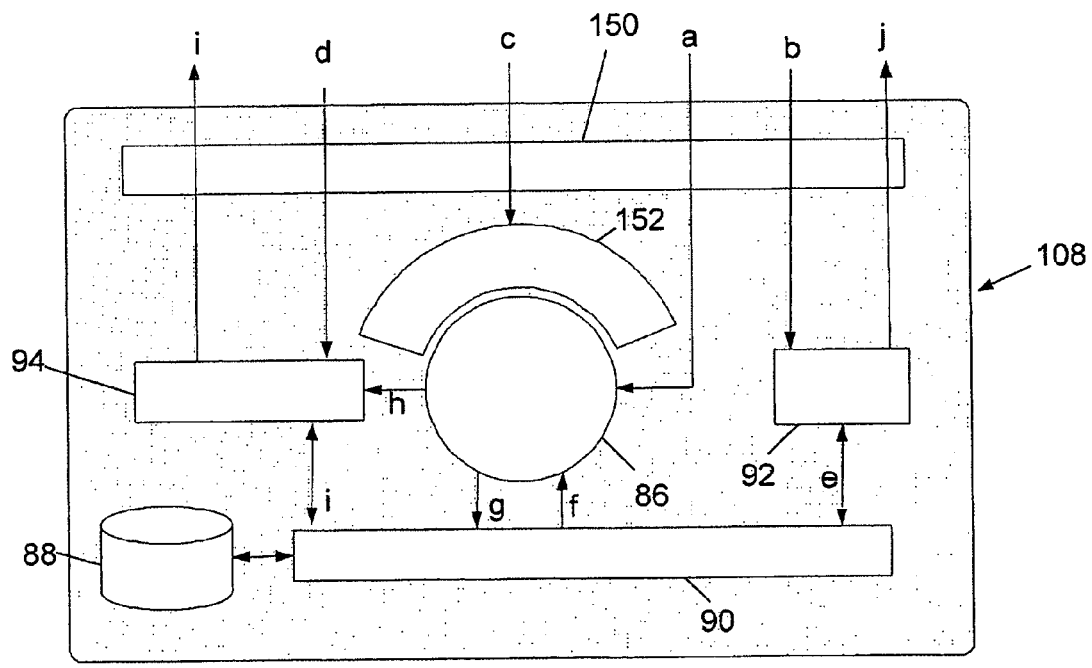
FIG. 15 shows the modules that make up the continuous monitoring and querying framework and the flow of information in this framework.

The Continuous Monitoring Engine 94 is supported by computational framework 108 that implements the incremental creation of abstractions. FIG. 15 shows the modules that make up the continuous monitoring and querying framework and the flow of information in this framework. In addition to the modules shown in FIG. 8, framework 108 comprises an internal controller 150 and an internal knowledge base 152, which is used by the Temporal Abstraction Module (TAM) 86 in the incremental abstraction process. The TAM 86 is the I-KBTA computational engine and the Continuous Monitoring Engine (CME) 94 monitors the abstracted data and raises alerts.

The arrows in FIG. 15 represent the following types of information: raw data a, query/exploration results b, knowledge c, alerts specifications/invocation/acknowledgment d, requests and results e, initialization at startup f, raw and abstracted data g, abstracted data h, alerts i, and result set/exploration results j.

Referring to FIG. 8 and FIG. 15, the monitoring engine enables the following tasks:
  Invoking alerts: The security expert 116 can activate or de-activate the current monitored patterns. The Continuous Monitoring Engine 94 maintains a local list of the activated alerts. When an alert is set ON/OFF, the TA controller 96 notifies the monitoring engine 94 and the monitoring engine 94 updates the local activated alerts list.

Continuous monitoring: The monitoring engine 94 receives new abstractions derived by the TA module 86. It uses the activated alerts list and the persistence services 90 to detect a monitored pattern. When a monitored pattern is the detected, the monitoring engine 94 sends an alert message to the controller 96. The raised alert information is stored in the storage manager 88 by the persistence services module 90 for later querying and exploration. The storage manager 88 will keep updated information regarding the raised alerts, such as the time it was raised, detected pattern, severity level, status etc.

Acknowledged alert: When the user acknowledges the raised alert, the controller 96 sends an alert acceptance message to the monitoring engine 94 which updates the alert information.

The computational and monitoring framework supports the following functional specifications:

I-KBTA computation:
  Incremental Computation—The continuously arriving raw data can be added and abstracted incrementally
  Adjustability—The provided computational framework can be extended to support new temporal-abstraction tasks that are not currently defined
  Scalability—Provides a distributed computing architecture to handle large numbers of data.

Internal KB services:
  Adding new knowledge elements or updating existing ones using a knowledge definition language (KDL). The knowledge elements are updated through the Knowledge Acquisition Module 80 and sent by the TA Controller 96.
  Activate or de-activate existing knowledge elements.
  Providing persistence of the raw data, generated abstractions, raised alerts and the abstraction process details (e.g., abstracted-from links, etc.)

Continuous monitoring:
  Receive any knowledge element specified as a candidate for continuous monitoring
  Specify monitoring conditions on the attributes of the monitored instances (e.g., value, duration, beginning, ending, type etc.)
  Monitoring conditions can be specified on a group of subjects (e.g., more than 20% of infected computers)
  Continuously monitor instances of the specified candidate knowledge elements
  Alerts are induced by satisfying monitoring conditions
  Alerts can be activated or deactivated
  A language for alert behavior should be specified (e.g., should the same alert be raised again?)

Figure 16:
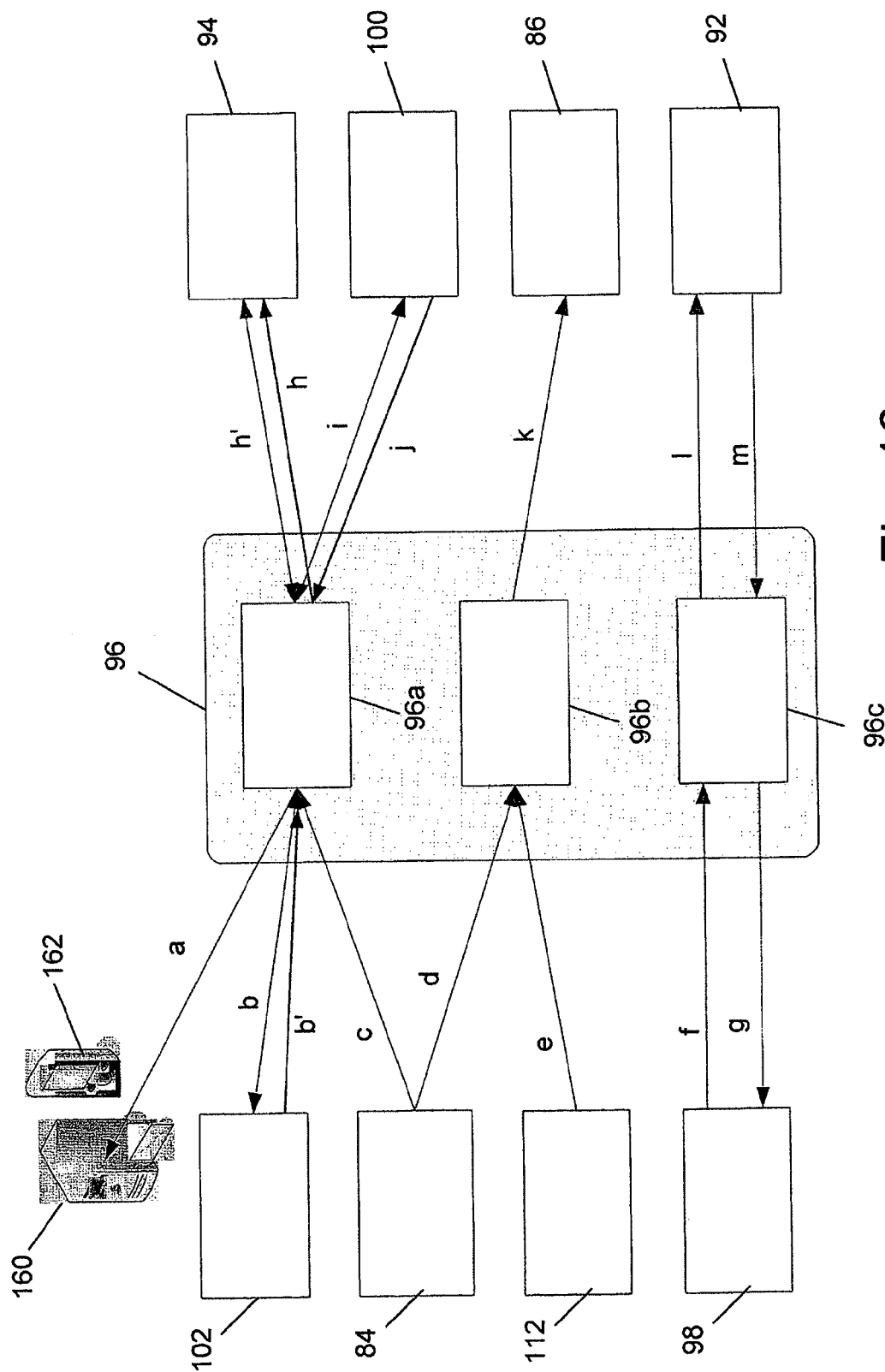
FIG. 16 shows schematically how the Temporal Abstraction Section handles queries and synchronizes the integration of data and knowledge.

The Temporal Abstraction Controller (TAC) 96 is responsible for handling queries and synchronizing the integration of data and knowledge. The TAC 96 consists of three components to handle these tasks: the Alert Handler 96a, the Query Handler 96c, and the Updated data and knowledge Handler 96b. FIG. 16 shows schematically how these three components support the following five processes:

Query handling—The Query Handler 96c receives a query f, submitted by the security expert through the Visual Exploration Module 98, and forwards it l to the Query Module 92. The Query Module 92 answers the query and returns the results m to the Query Handler 96c which forwards the results g to the Visual Exploration Module 98.

Handling updated data and knowledge: When the Updated data and knowledge Handler 96b of controller 96 receives new data record e from the data source 112 it immediately sends it k to the TA Module 86. The controller 96 will receive changes in the ontology d from the KB Access Module 84 and send it k to the TA Module 86 as well. In both cases the TA Module 86 will derive new abstractions or update existing ones.

Handling alert activation: The security expert uses the Alert Invocation Module 100 to activate or de-activate monitored patterns. The Alert Handler 96a of controller 96 retrieves the monitored patterns definition c from the KB 84 and sends it to the Alert Invocation Module 100. The security expert can activate new alerts or de-activate monitored alerts. The controller 96 updates h the monitoring engine 94 with the changes.

Handling raised alert: Whenever a monitored pattern is identified by the monitoring engine 94 it sends an alert message h' to the Alert Handler 96a of controller 96 with all necessary information such as what pattern was identified, duration of the pattern, etc. The controller 96 forwards the alert message a,b to all relevant notification platforms such as the Visual Monitoring Module 102, Mail-Server 160, or Mobile phone 162.

Handling acknowledged alert: When the user accepts the alert in the Visual Monitoring Module 102, it sends an acknowledge message b' to the Alert Handler 96a of controller 96. The controller 96 forwards h the acknowledge message to the monitoring engine 94 that updated the alert's status in the eTIME storage.

The function of the Visual Exploration Module (VEM) 98 is to display and enable interactive visual exploration of a repository of time-oriented security data. The user interactively submits time-oriented queries and can visualize and explore both raw data and abstractions. The Visual Exploration Module 98 supports two views of the security data:
  Individual subject view, e.g. all worm patterns on server #111 in the last 10 days
  Multiple subjects view, e.g. exploration of installations on cellular phones followed by at least 5 outgoing calls within the next 2 minutes The development of the VEM is based on the experience gained during the development of the KNAVE-II [3] and VISITORS [4] systems, used for similar exploration tasks in the medical domain.

Figure 17:
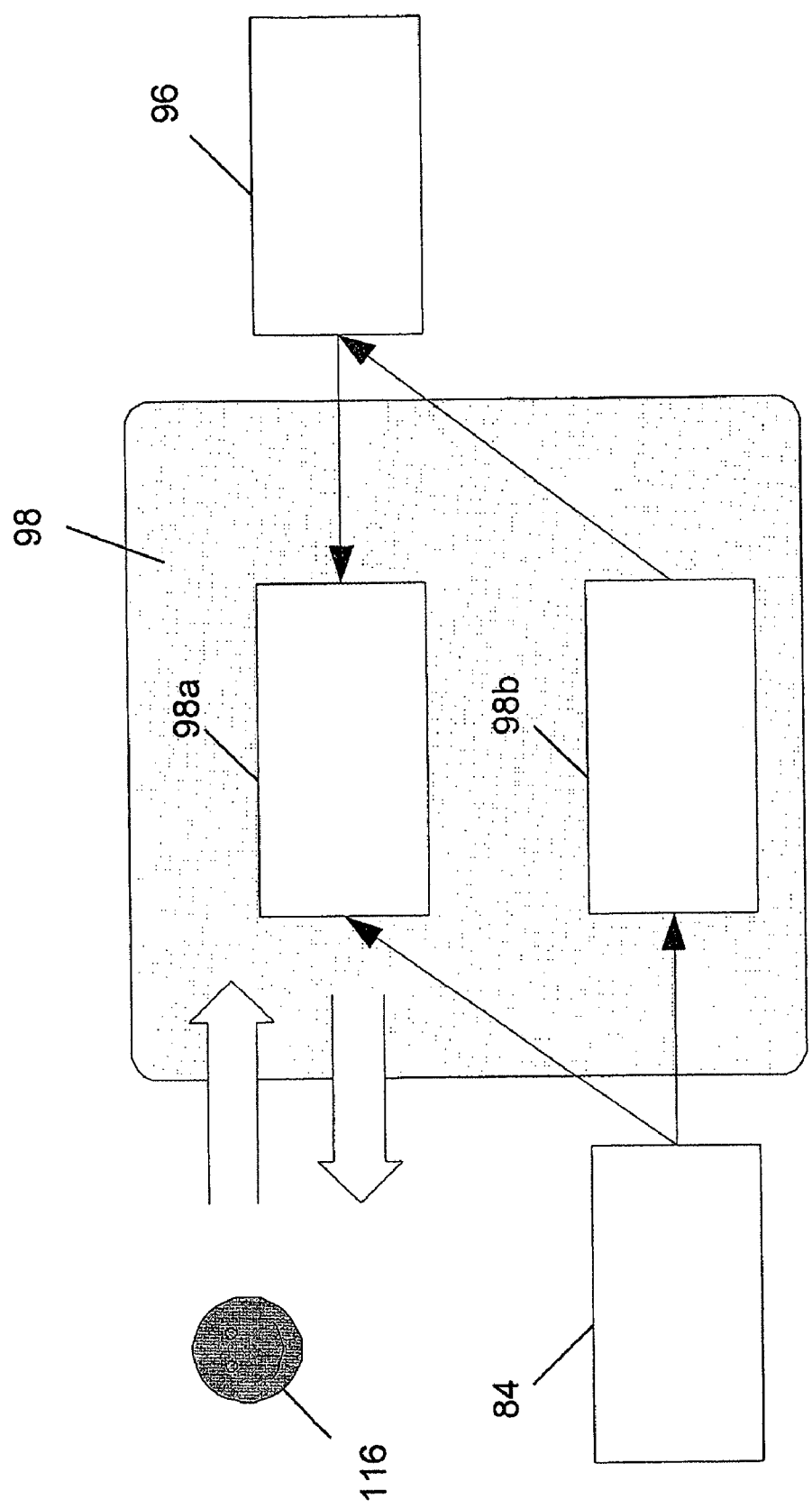
FIG. 17 shows the main components of the Visual Exploration Module.

The querying and exploration process is based on the security ontology. First, the KB Access Module 84 retrieves the ontology from the KB 106. The security expert 116 uses the ontology to submit the query. The request is forwarded to the TA Controller 96 which sends the request to the Query Module 92. The results are returned to the Visual Exploration Module 98 for visualization. FIG. 17 shows the main components of the Visual Exploration Module 98, which comprises two submodules—the visualization builder service 98a and the query builder 98b.

Figure 18:
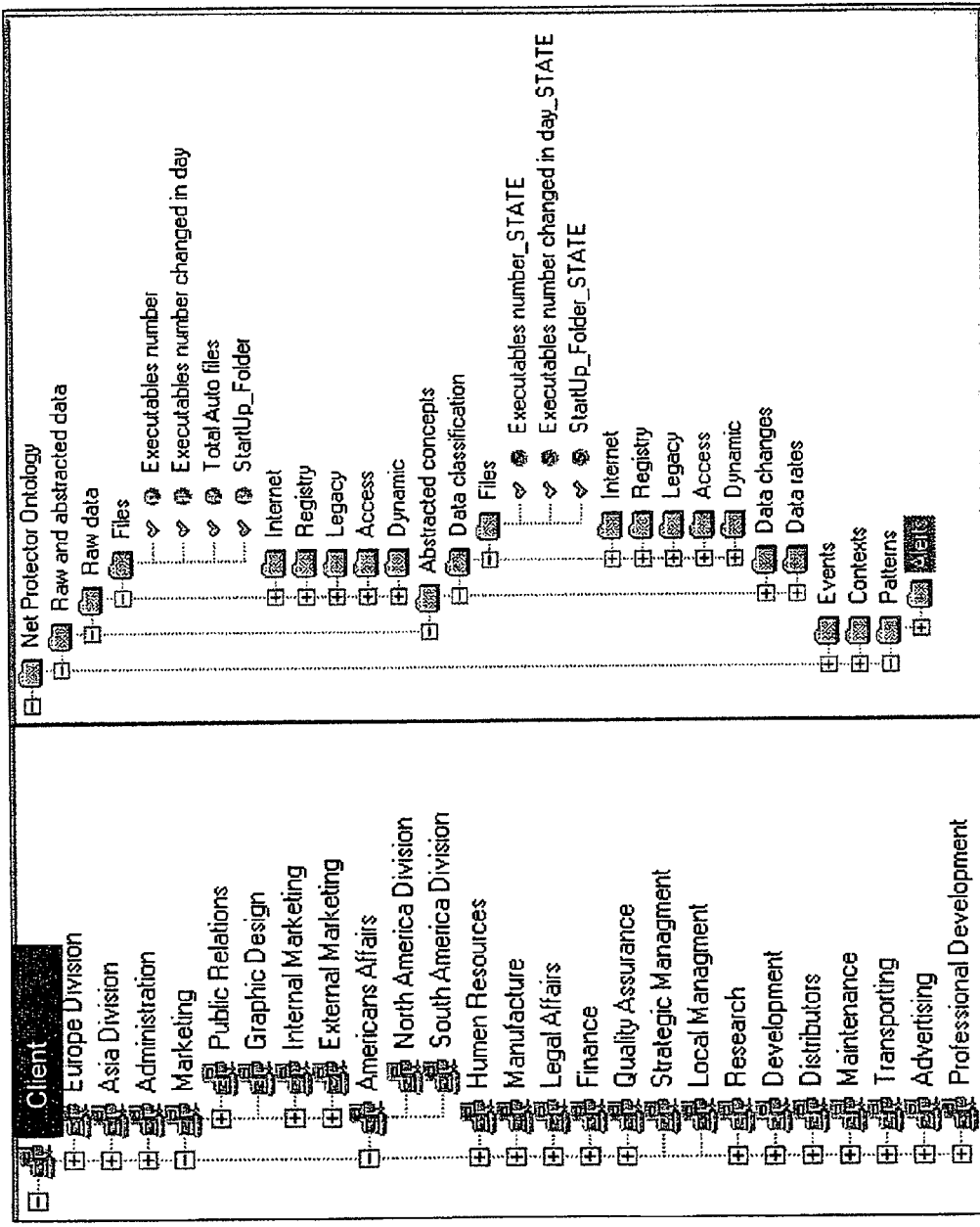
FIG. 18 shows an example of the security ontology and subjects selection panels.
Figure 19:
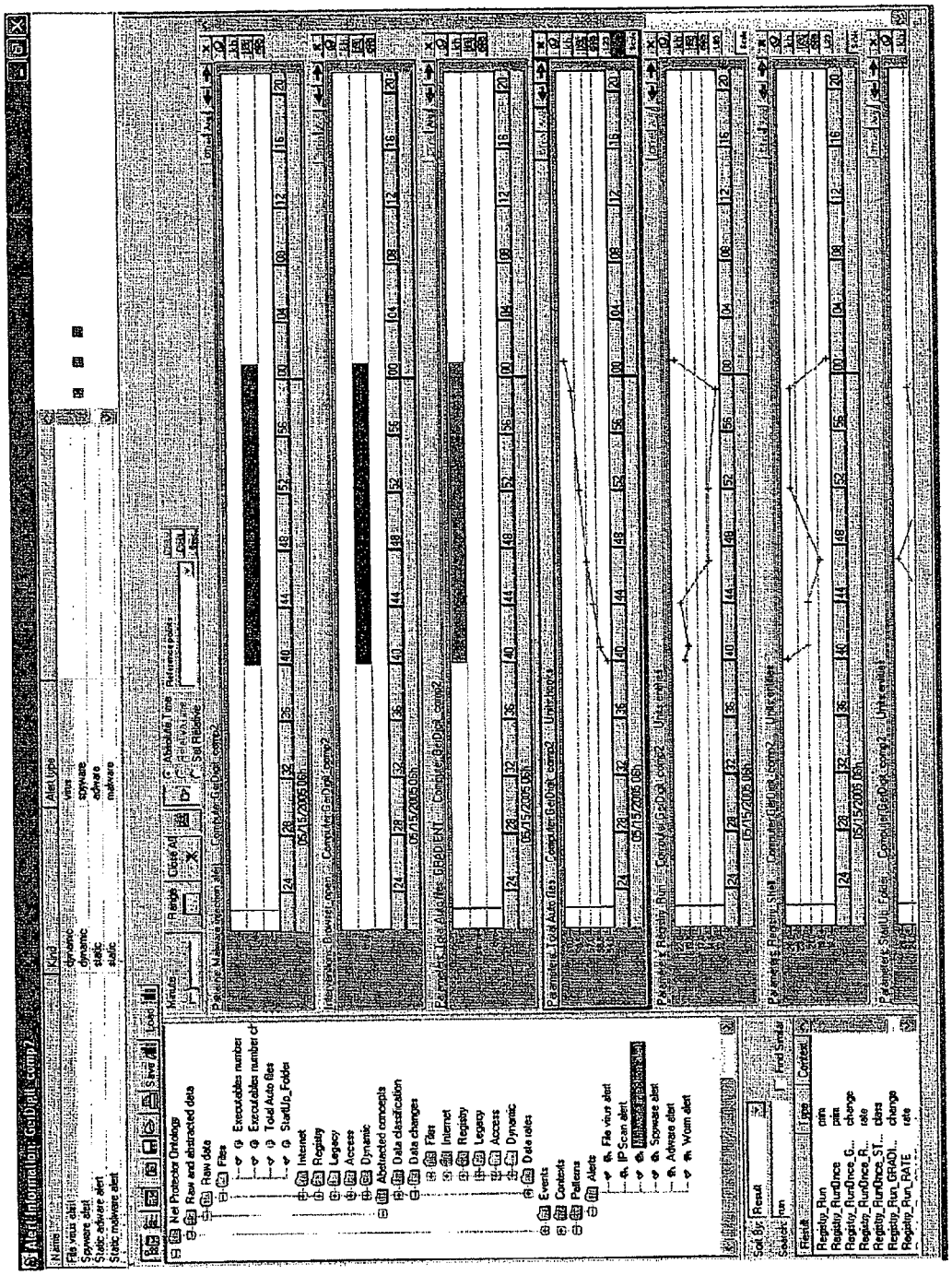
FIG. 19 shows an example of a computer screen showing the exploration of the data of one computer.

The main functions provided by the VEM are:
Setup connection:
  Authentication—only authorized users can use the module
  KB and data selection—selecting the explored ontology and data source at login Graphical user interface:
- easy to use and intuitive interface
  - Windows common functionality such as tooltips, hide panels, multiple exploration windows, floating menus etc.
  - hierarchical tree view of the security ontology (see FIG. 18, which shows an example of the security ontology and subjects selection panels)
  - provides two possible views—a concept oriented view or a context oriented view
  - easy selection of concepts to explore
  - search concepts by name
  - Subject selection panel (see FIG. 18)
  - easy selection of subjects to explore
  - search subject by different attributes (name, location, type etc.)
  - possible hierarchical visualization of the organization/network structure Domain ontology exploration:
- Exploring the concepts and the relations between them
- Navigation along semantic links in the ontology (abstracted-from, abstracted-into, component-of, generated-context etc.)
- Showing a KB definition for each concept in ontology Query building:
- Construct complex query
- Select concept to explore
- Filter subject using the subject's attributes, e.g., all servers in marketing dept.
- Filter subjects using a pattern definition, e.g. concept B started at the latest 10 minutes after concept A and, concept B is at least 2 hrs. duration
- The defined queries may be saved in a user's "favorite query" list for future use Exploration:
- Submitting queries in two ways: simple query using the ontology tree or search panel, and custom query using the query builder
- Enable single subject exploration and multiple subject exploration
- Changing time scale and time granularity of the explored data
- Changing the reference point of the explored data: absolute (calendaric) and relative (specific event)
- Present tooltip with information about the contents of the displayed entity
- Showing statistics related to the visualized data Exploration of the data of one subject:
- Each graphical window contains data of one concept for one subject
- Display of both raw security data and derived temporal abstractions
- Show argument concepts: display the direct concepts used for deriving the selected parameter
- Show full derivation tree: display all abstract and raw data that participated in the derivation of the selected parameter An example of a computer screen showing the exploration of the data of one subject is shown in FIG. 19. The visualization is based on KNAVE-II system, which enables exploration of time-oriented data for one individual computer. The example shows an infected computer. The user can see the temporal pattern represents the malware, and the abstracted concepts and raw data which take part in a pattern derivation.

Figure 20:
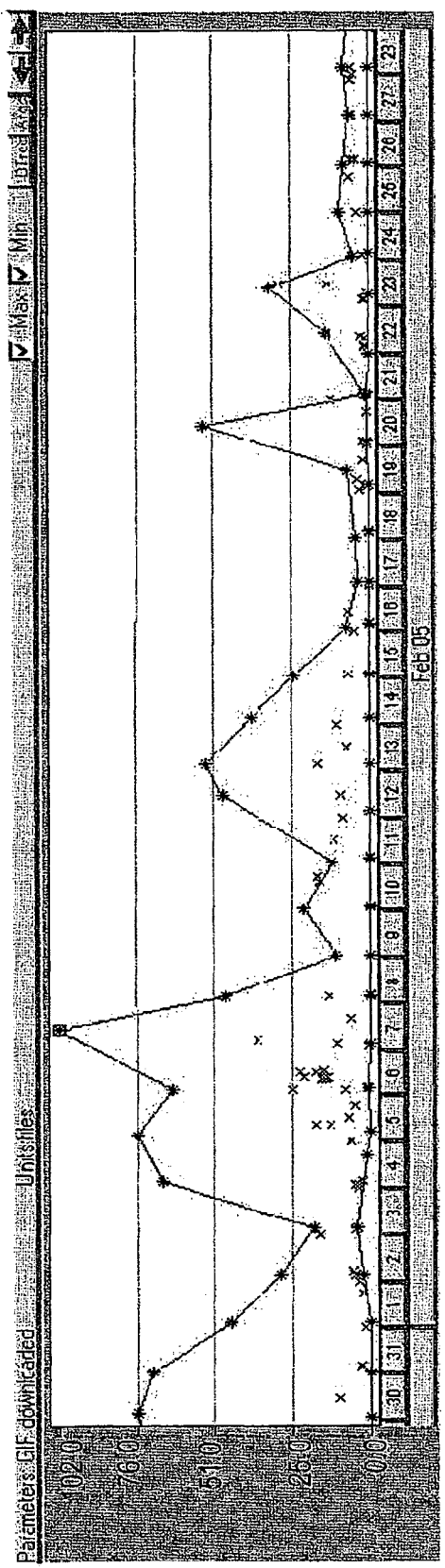
FIG. 20 shows an example of raw data exploration for multiple subjects.
Figure 21:
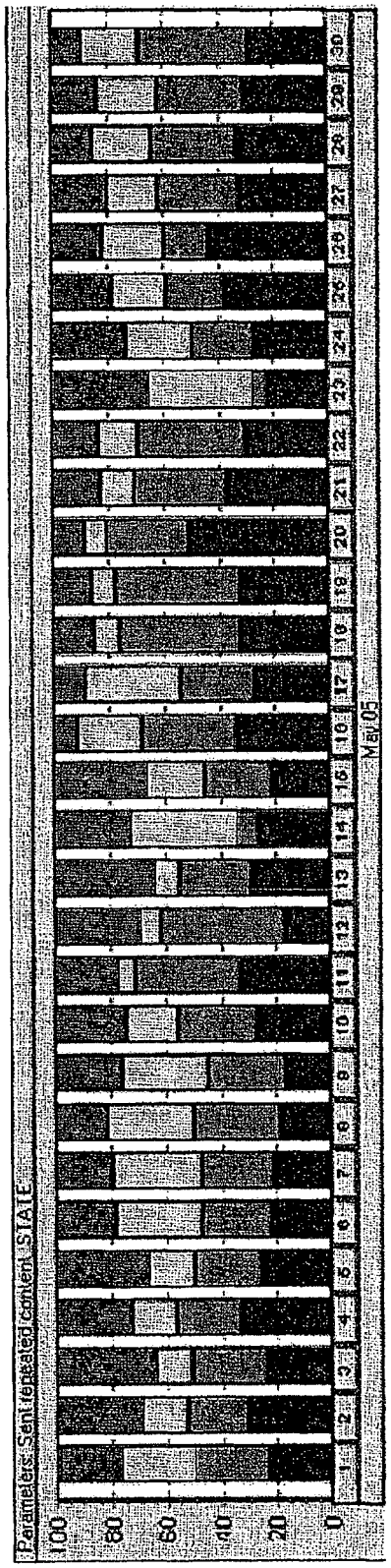
FIG. 21 shows an example of abstract parameter exploration for multiple subjects.
Figure 22:
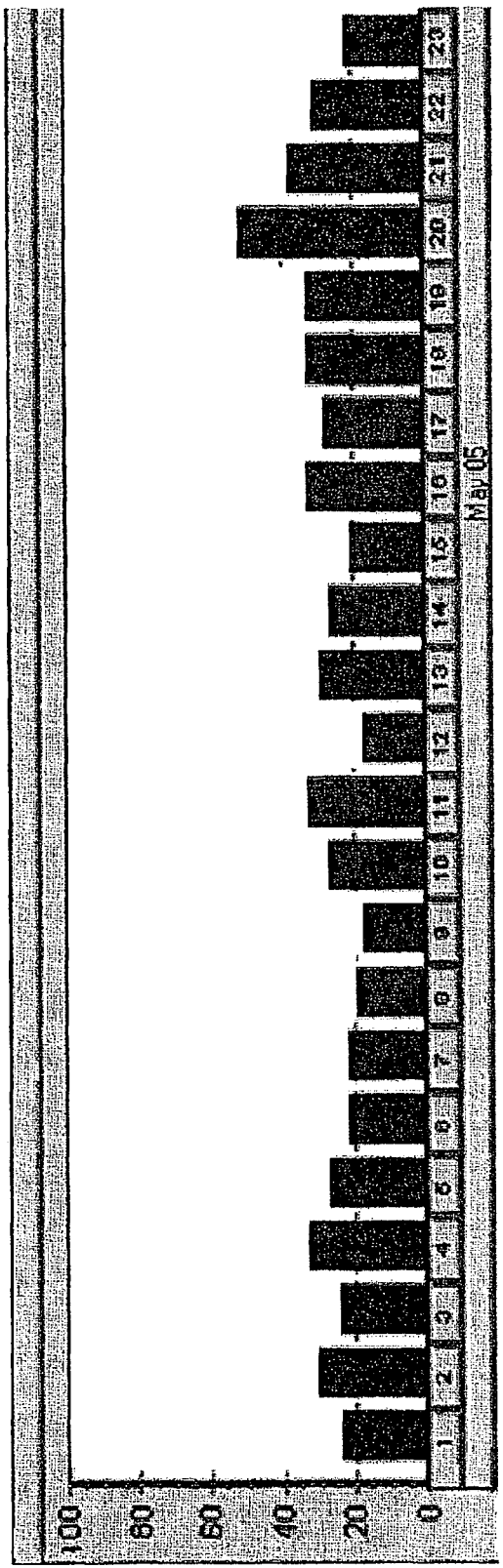
FIG. 22 shows an example of pattern exploration for multiple subjects.
Figure 23:
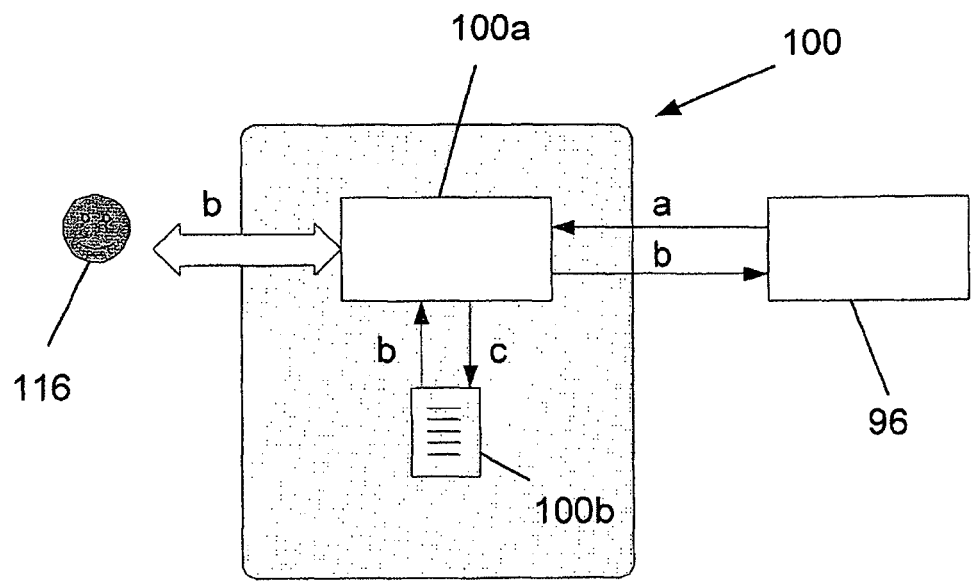
FIG. 23 shows the Alerts Invocation Module and how it is employed to invoke alerts.

Exploration of the data of multiple subjects:
- Enabling selection of a set of subjects
- Each graphical window contains data regarding one concept for a number of subjects
- Display of both raw security data and derived temporal abstractions
- Exploration of one raw concept for sub-set of subjects (see FIG. 20 for an example of raw data exploration for multiple subjects)
- min values are shown as the bottom line; max values are shown as the top line
- the user can change the time granularity
- Exploration of one abstraction for sub-set of subjects (see FIG. 21 for an example of abstract parameter exploration for multiple subjects)
- display the segmentation of the subjects to the possible values of a concept
- Exploration of one pattern for sub-set of subjects (see FIG. 22 for an example of pattern exploration for multiple subjects)
- Display the percentage of subjects that a specified pattern was detected on Additional requirements of the VEM are:
- Customization of the displays for each specific task
- Save/print/export visualized data
- Enlarge a graphical data window (zoom)
- Add/Remove textual information
- "What if:" dynamic simulation of hypothetical modifications of raw data over one individual subject The alert invocation module (AIM) 100 is a user application interface used for invoking alerts. FIG. 23 shows the Alerts Invocation Module 100 and how it is employed to invoke alerts. The module comprises an alerts visualization service 100a, which maintains a local invoked alerts table 100b. The Temporal Abstraction Controller 96 retrieves the monitored alerts definition from the KB 82. The Alerts Invocation Module 100 visually enables the security expert 116 to turn on a non-activated alert and turn off an activated alert. Invoking alert will require information such as start-time and end-time to monitor and notification platforms. The changes are sent to the controller 96. The arrows show the flow of the following information: monitored alerts definition a, alert ON/OFF b, and activated alerts c.

Figure 24:
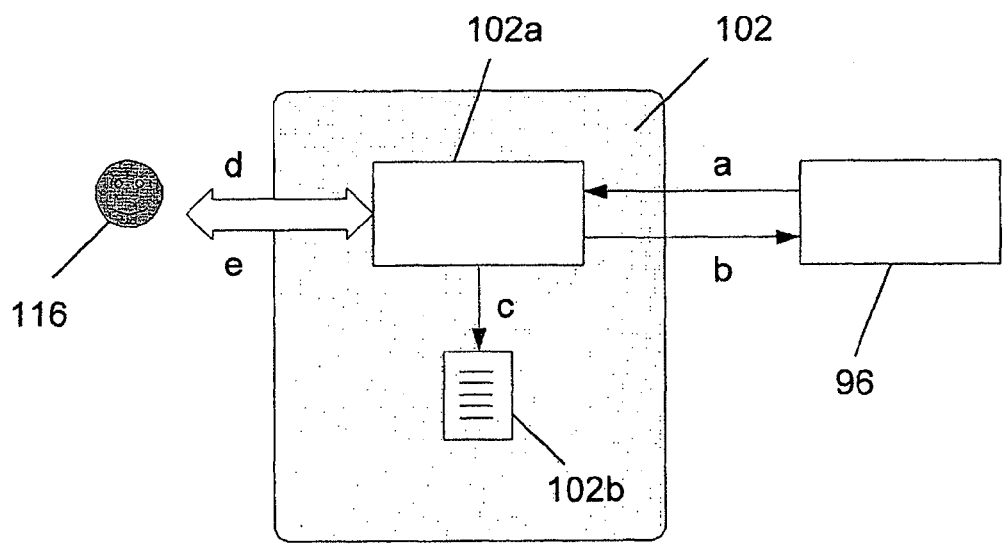
FIG. 24 shows the Visual Monitoring Module and how it is employed to notify of alerts.

The Visual Monitoring Module (VMM) 102 provides visual interface for alerts notification. FIG. 24 shows the Visual Monitoring Module 102 and how it is employed to notify of alerts. The module comprises an alerts visualization service 102a, which maintains a local invoked raised alerts/local storage table 102b. The module supports different types of notification methods such as popup windows, sound and visual icons that are executed according to the alert's severity level. The security expert will be able to respond the alert and to use the alert's information for exploration. The arrows show the flow of the following information: raised alert a, acknowledge b, raised alert/acknowledge c, visual alert notification d, and acknowledge alert e.

Figure 25:
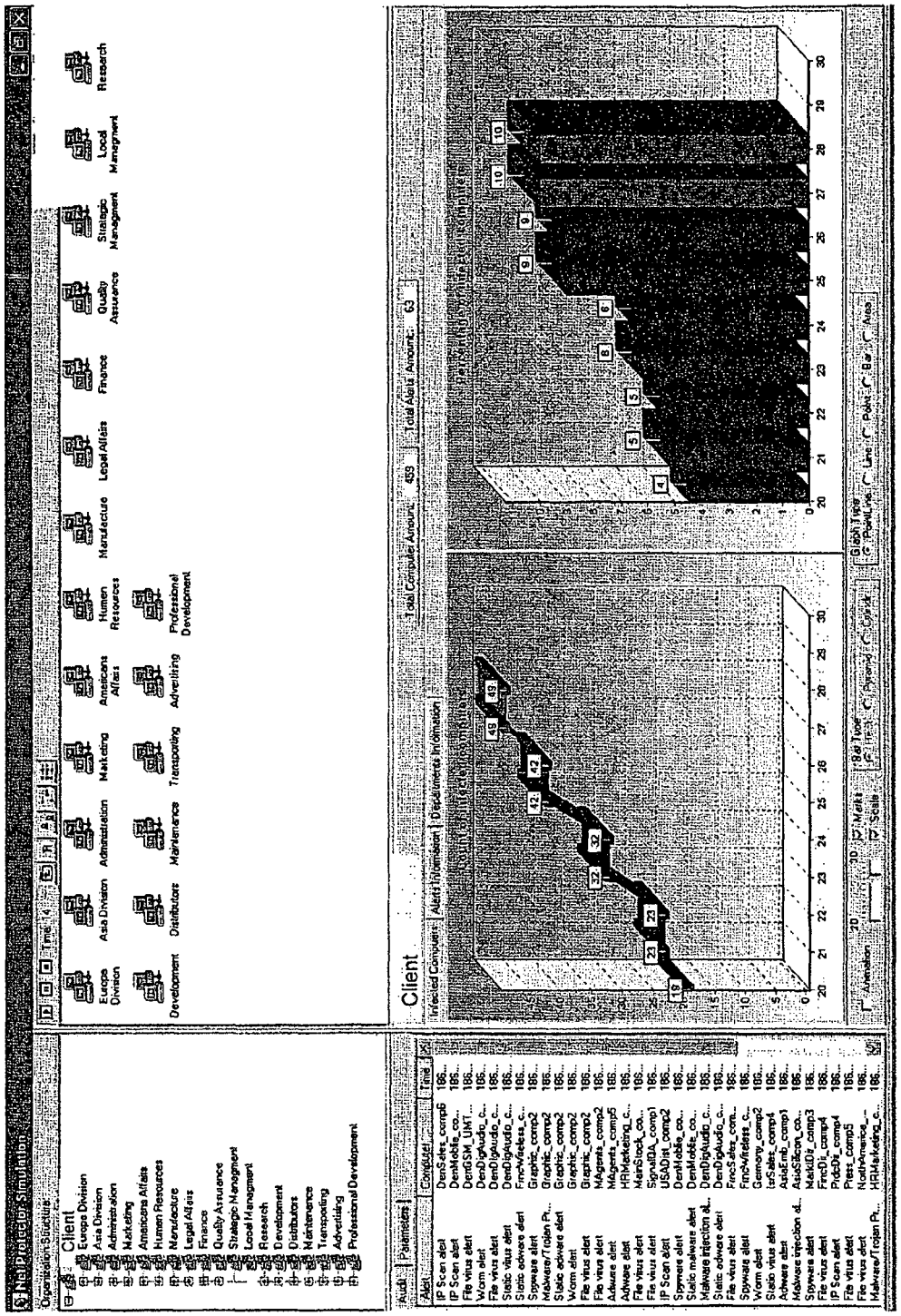
FIG. 25 shows a simulation of the main window of a system employing eTIME to protect an international corporation's computer network.

FIG. 25 shows a simulation of the main window of a system employing eTIME to protect an international corporation's computer network. The example shows an alert indication in several ways: by color—on the top of the screen a red color denotes a significant alert, by list of all currently active alerts—on the bottom left side, and by graph—on the bottom right side.

Although embodiments of the invention have been described by way of illustration, it will be understood that the invention may be carried out with many variations, modifications, and adaptations, exceeding the scope of the claims.

BIBLIOGRAPHY

[1] D. Boaz, and Y. Shahar "A distributed temporal-abstraction mediation architecture for medical databases", *Artificial Intelligence in Medicine,* 2005. 34 (1), 3-24.

[2] Y. Shahar, "A Framework for knowledge-based temporal abstraction", *Artificial intelligence,* 1997. 90(1-2): p. 79-133.

[3] Y. Shahar, D. Goren-Bar, M. Galperin, D. Boaz, and G. Tahan "KNAVE II: A distributed architecture for interactive visualization and intelligent exploration of time-oriented clinical data", *Intelligent Data Analysis in Medicine and Pharmacology.* 2003. Protaras, Cyprus.

[4] D. Klimov and Y. Shahar "A Framework for Intelligent Visualization of Multiple Time-Oriented Medical Records", *AMIA.* 2005.

[5] A. Spokoiny and Y. Shahar "Momentum—An active time-oriented database for intelligent abstraction, exploration and analysis of clinical data", *Medical Informatics (MEDINFO).* 2004. San Francisco, Calif.

The invention claimed is:

1. A computer architecture system that enables monitoring of accumulated time-oriented data from a computer network and the use of Knowledge-Based Temporal Abstraction (KBTA) to derive temporal abstractions (TA) from the data accumulated from modules of said computer architecture system and knowledge provided by human experts related to the operation of elements of said computer network in order to identify electronic threat patterns and create alerts for both known and unknown eThreats; said computer architecture system comprising at least one of each of the following modules:
   a. a Knowledge Acquisition Module (KAM), which is a client application configured for maintaining and exploring the KBTA security ontology and for defining monitored patterns;
   b. a Knowledge Base (KB) Module, configured to hold the security ontology repository in which all concepts and the relations between them and all of the monitored patterns are defined;
   c. a Knowledge Base Access Module (KBAM), configured to be the only access point to the KB from which the KB can be updated and read;
   d. a Temporal Abstraction Module (TAM), which comprises the computational mechanisms that are configured to integrate the raw security data records with said knowledge provided by human experts and to compute said temporal abstractions;
   e. a Data, Abstractions and Raised Alerts Storage Module configured to store all raw data records, derived temporal abstractions, and raised alerts;
   f. a Persistence Services Module, configured to keep all computed abstractions and temporal patterns persistent until updated or removed by applying the abstraction process on newly arrived security data;
   g. a Query Module, configured to use the data and abstractions stored in said Data, Abstractions and Raised Alerts Storage Module to answer queries;
   h. a Continuous Monitoring Engine (CME) Module, configured to monitor the output from the computational mechanisms of the Temporal Abstraction Module (TAM) and to produce an alert when an eThreat pattern is detected;
   i. a Temporal Abstraction Controller (TAC) Module, configured to handle queries requests and to synchronize the integration of data and knowledge;
   j. a Visual Exploration Module (VEM), which is a graphical user application configured to allow exploration of both raw and abstracted data;
   k. an Alert Invocation Module (AIM), which is a graphical user application configured to activate and to de-activate alerts; and
   l. a Visual Monitoring Module (VMM), which is a graphical user interface configured to provide notification of alerts;
wherein, predetermined communication links are provided to interconnect said modules allowing them to share information and work together to identify electronic threat patterns and create alerts for both known and unknown eThreats.

2. The computer architecture system of claim 1, wherein said computer architecture system is configured to identify electronic threat patterns and create alerts for both known and unknown eThreats by integrating all of the following:
   a. a set of time-oriented security data sources;
   b. a set of one or more knowledge bases configured to be specific to the process of detecting meaningful temporal patterns of not only raw data but also higher-level, abstracted concepts;
   c. a temporal abstraction computational process adapted to create abstract patterns such as eThreats from the integration of the data and knowledge;
   d. a monitoring service configured to continuously apply relevant security knowledge to the accumulating data;
   e. an effective visualization interface configured to explore multiple security-oriented records and their correlations over time, thus supporting also an interactive mode that enables identifying new eThreats;
   f. a graphical knowledge-acquisition and maintenance tool configured to enable a security expert to easily add new patterns to the knowledge base, or to modify existing ones; and
   g. an effective visualization interface configured to provide notification of alerts.

3. The computer architecture system of claim 1, wherein said computer architecture system is configured to support acquiring multiple security-related ontologies such as a PC ontology, a server ontology, a cellular phones/pocket PC ontology, and network elements, in a flexible way.

4. The computer architecture system of claim 1, wherein said computer architecture system is configured to enable a distributed, parallel computation for the monitoring and creation of temporal abstractions from given multiple records.

5. The computer architecture system of claim 1, wherein said computer architecture system is configured to enable monitoring of eThreat patterns defined in a fuzzy fashion as a set of constraints, rather than an exact signature of each and every known threat, and thereby enables detection of instances of threats that have not been encountered before.

6. The computer architecture system according to claim 1, wherein said computer architecture system is configured to be operated in an automated, continuous mode for monitoring, recognition and detection of known eThreats.

7. The computer architecture system according to claim 1, wherein said computer architecture system is configured to be operated in a mode that employs an interactive, human-operated intelligent tool for dynamic exploration of the contents of a security storage.

* * * * *